United States Patent
Takada et al.

(10) Patent No.: US 11,606,213 B2
(45) Date of Patent: Mar. 14, 2023

(54) ON-VEHICLE AUTHENTICATION SYSTEM, COMMUNICATION DEVICE, ON-VEHICLE AUTHENTICATION DEVICE, COMMUNICATION DEVICE AUTHENTICATION METHOD AND COMMUNICATION DEVICE MANUFACTURING METHOD

(71) Applicants: National University Corporation Nagoya University, Nagoya (JP); AutoNetworks Technologies, Ltd., Mie (JP); Sumitomo Wiring Systems, Ltd., Mie (JP); Sumitomo Electric Industries, Ltd., Osaka (JP)

(72) Inventors: Hiroaki Takada, Nagoya (JP); Ryo Kurachi, Nagoya (JP); Hiroshi Ueda, Mie (JP)

(73) Assignees: National University Corporation Nagoya University, Nagoya (JP); AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 490 days.

(21) Appl. No.: 16/621,389

(22) PCT Filed: Jun. 19, 2018

(86) PCT No.: PCT/JP2018/023224
§ 371 (c)(1),
(2) Date: Dec. 11, 2019

(87) PCT Pub. No.: WO2018/235799
PCT Pub. Date: Dec. 27, 2018

(65) Prior Publication Data
US 2020/0153636 A1 May 14, 2020

(30) Foreign Application Priority Data

Jun. 20, 2017 (JP) .............................. JP2017-120830

(51) Int. Cl.
*H04L 29/06* (2006.01)
*H04L 9/32* (2006.01)
(Continued)

(52) U.S. Cl.
CPC ........ *H04L 9/3247* (2013.01); *G06K 15/4095* (2013.01); *H04L 9/0819* (2013.01);
(Continued)

(58) Field of Classification Search
CPC ... H04L 9/3247; H04L 9/0819; H04L 9/0894; H04L 9/3073; H04W 4/40; G06K 15/4095; G06Q 50/265
(Continued)

(56) References Cited

U.S. PATENT DOCUMENTS 7,467,302 B2 * 12/2008 Kao .................... H04W 12/033
713/153
9,608,818 B2 * 3/2017 Shiota .................. H04L 9/0822
(Continued)

FOREIGN PATENT DOCUMENTS

JP 2002-288605 A 10/2002
JP 2006-262425 A 9/2006
(Continued)

OTHER PUBLICATIONS

Hoppe, "Security threats to automotive CAN networks—Practical examples and selected short-term countermeasures", 2011, Reliability Engineering and System Safety, pp. 11-25 (Year: 2011).*
(Continued)

*Primary Examiner* — Noura Zoubair
*Assistant Examiner* — Gregory A Lane
(74) *Attorney, Agent, or Firm* — Honigman LLP

(57) ABSTRACT

A communication device stores a first secret key and a first public key, and the on-vehicle authentication device stores a (Continued)

second secret key, a second public key and a signature verification key. The on-vehicle authentication device acquires the first public key, verifies the authenticity of the electronic signature using a signature verification key, encrypts the second public key using the authentic first public key and transmits the encrypted second public key. The communication device receives the encrypted second public key, decrypts the encrypted second public key using the first secret key, encrypts the first public key using the decrypted second public key. The on-vehicle authentication device receives the encrypted first public key, decrypts the encrypted first public key using the second secret key, and authenticates that the communication device is an authentic device when the decrypted first public key has been determined to be authentic.

8 Claims, 12 Drawing Sheets

(51) Int. Cl.
| | | |
|---|---|---|
| *H04W 4/40* | (2018.01) | |
| *G06K 15/00* | (2006.01) | |
| *H04L 9/08* | (2006.01) | |
| *H04L 9/30* | (2006.01) | |
| *G06Q 50/26* | (2012.01) | |

(52) U.S. Cl.
CPC .......... *H04L 9/0894* (2013.01); *H04L 9/3073* (2013.01); *H04W 4/40* (2018.02); *G06Q 50/265* (2013.01)

(58) Field of Classification Search
USPC ........................................................ 713/171
See application file for complete search history.

(56) References Cited

U.S. PATENT DOCUMENTS

| | | | |
|---|---|---|---|
| 2001/0021251 A1* | 9/2001 | Kasai .................... | H04L 9/3247 |
| | | | 713/176 |
| 2002/0129251 A1 | 9/2002 | Itakura et al. | |
| 2010/0040234 A1* | 2/2010 | Alrabady ............ | H04W 12/069 |
| | | | 380/278 |
| 2011/0314284 A1 | 12/2011 | Chou | |
| 2012/0128157 A1 | 5/2012 | Braun | |
| 2014/0232520 A1 | 8/2014 | Kawamura et al. | |
| 2017/0026174 A1* | 1/2017 | Pang .................... | H04W 12/50 |
| 2017/0111177 A1 | 4/2017 | Oguma et al. | |
| 2017/0142123 A1 | 5/2017 | Komano et al. | |
| 2017/0244568 A1* | 8/2017 | Brickell .............. | H04W 12/041 |

FOREIGN PATENT DOCUMENTS

| | | |
|---|---|---|
| JP | 2012-005129 A | 1/2012 |
| JP | 2012-528499 A | 11/2012 |
| JP | 2014-077281 A | 5/2014 |
| JP | 2014-156723 A | 8/2014 |
| JP | 2017-060031 A | 3/2017 |
| JP | 2017-079369 A | 4/2017 |
| JP | 2017-091360 A | 5/2017 |

OTHER PUBLICATIONS

International Search Report of PCT/JP2018/023224.
Takaya Kubota, Mitsuru Shiozaki and Takeshi Fujino, "Proposal and Implementation of Key Exchange Protocol suitable for In-Vehicle Network based on Symmetric Key Cipher using PUF as Key Storage", escarEU2016, 2016.

* cited by examiner

FIG.4

ECU PUBLIC KEY DB

| ID | ECU PUBLIC KEY | ELECTRONIC SIGNATURE |
|---|---|---|
|  |  |  |
|  |  |  |
|  |  |  |
| ⋮ | ⋮ | ⋮ |

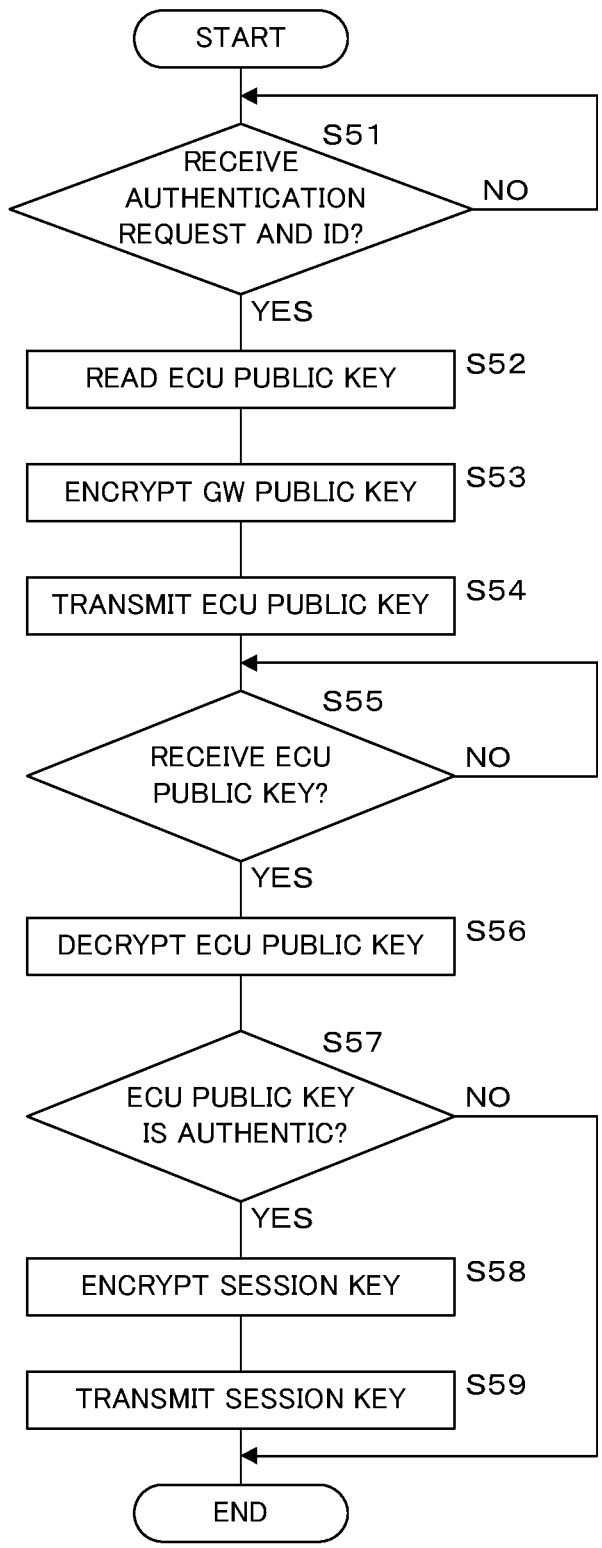

ON-VEHICLE AUTHENTICATION SYSTEM, COMMUNICATION DEVICE, ON-VEHICLE AUTHENTICATION DEVICE, COMMUNICATION DEVICE AUTHENTICATION METHOD AND COMMUNICATION DEVICE MANUFACTURING METHOD

CROSS-REFERENCE TO RELATED APPLICATIONS

This application is the U.S. national stage of PCT/JP2018/023224 filed on Jun. 19, 2018, which claims priority of Japanese Patent Application No. JP 2017-120830 filed on Jun. 20, 2017, the contents of which are incorporated herein.

FIELD

The present disclosure relates to an on-vehicle authentication system, a communication device, an on-vehicle authentication device, a communication device authentication method and a communication device manufacturing method, for authenticating the communication device connected to the network inside a vehicle.

BACKGROUND

In these years, vehicle autonomous driving technologies, vehicle driving assistance technologies or the like have been studied and developed, and vehicles are being made highly functional. As vehicles are being made highly functional, a control device, such as an ECU (Electronic Control Unit), becomes highly functional and complicated in hardware and software.

On the other hand, there is a problem that a vehicle is attacked, for example, hijacked, by installing an unauthentic device or software in the control system of the vehicle. Various countermeasures, such as the encryption of communication, have been examined to prevent illegal attack to the vehicle.

Japanese Patent Application Laid-Open Publication No. 2014-156723 (Patent Document 1) proposes an electronic key registration system in order to ensure security at the time when the electronic key of a vehicle is replaced with a new one and the new electronic key is re-registered. In this electronic key registration system, an ECU mounted on the vehicle communicates with a center outside the vehicle, and checks whether the electronic key to be used for replacement is authentic, whereby security is improved.

Furthermore, Japanese Patent Application Laid-Open Publication No. 2014-077281 (Patent Document 2) proposes an electronic key registration system wherein, in the case that an ECU is replaced because of failure or the like, an electronic key is registered in an ECU to be used after the replacement. In this electronic key registration system, the ECU after the replacement transmits information read from the electronic key to a center outside the vehicle and performs checking, and in the case that the checking is completed successfully, the electronic key is registered, whereby security is improved.

Japanese Patent Application Laid-Open Publication No. 2017-060031 (Patent Document 3) proposes an on-vehicle control system wherein data commonly used between a management device and an ECU is generated and this data is used to generate a message authentication code for communication or used as an encryption key in order to improve security. In this on-vehicle control system, the management device and the ECU store first data commonly used therebetween, the management device generates second data and transmits the second data to the ECU, and the management device and the ECU generates third data using the first data and the second data.

In Takaya Kubota, Mitsuru Shiozaki and Takeshi Fujino, "Proposal and Implementation of Key Exchange Protocol suitable for In-vehicle Network based on Symmetric Key Cipher using PUF as Key Storage", escarEU2016, 2016. (Non-patent Document 1) proposes a method wherein, at the time when a new ECU is added to a vehicle, encryption processing keys required for communication via an in-vehicle network are transmitted and received safely between the security gateway mounted on the vehicle and the new ECU. With this method, by using a master key and an initial master key owned by the security gateway and the initial master key written in the new ECU, the security gateway eventually transmits a communication session key to the ECU.

In the electronic key registration systems described in Patent Documents 1 and 2, although the electronic key is required to be checked using the center outside the vehicle, the vehicle is not always in an environment where the vehicle can communicate with devices outside the vehicle; hence, in the case that the vehicle cannot communicate with the center, there is a problem that the vehicle cannot use this system.

In the on-vehicle control system described in Patent Document 3, although the vehicle is not required to communicate with a center or the like, the first data common to the management device is required to be preliminarily written in the memory or the like of the ECU. In the case that, for example, a new ECU is mounted to replace a faulty ECU or to add a function, the common first data is required to be written in the memory of the new ECU to be used for replacement or addition. Hence, the worker who adds or replace the ECU can illegally acquire the first data. There is a fear that a malicious worker having illegally acquired the first data will, for example, write the first data in the memory of an unauthentic device and install the unauthentic device in the vehicle. Similarly, in the technology described in Non-patent Document 1, a common initial master key is required to be written in a new ECU, and the initial master key may leak at the time of the writing.

The present disclosure has been made in consideration of these circumstances, and it is an object of the present disclosure to provide an on-vehicle authentication system, a communication device, an on-vehicle authentication device, a communication device authentication method and a communication device manufacturing method, wherein, when the communication device is replaced with a new one or an additional communication device is mounted on a vehicle, this communication device can be authenticated without requiring wireless communication or the like with devices outside the vehicle.

SUMMARY

An on-vehicle authentication system according to an aspect of the present disclosure in which an on-vehicle authentication device authenticates a communication device newly connected to a network inside a vehicle, wherein the communication device comprises a first storage section in which a first secret key and a first public key are stored, the on-vehicle authentication device comprises: a second storage section in which a second secret key, a second public key and a signature verification key for verifying whether the electronic signature attached to the first public key is authentic are stored, a first public key acquiring section for acquiring the first public key attached with the electronic signature, a signature verification section for verifying whether the electronic signature attached to the first public key acquired by the first public key acquiring section is authentic using the signature verification key stored in the second storage section, a second public key encrypting section for encrypting the second public key stored in the second storage section using the first public key attached with the electronic signature having been determined to be authentic by the signature verification section, and a second public key transmitting section for transmitting the second public key encrypted by the second public key encrypting section to the communication device via the network, the communication device further comprises: a second public key receiving section for receiving the encrypted second public key from the on-vehicle authentication device, a second public key decrypting section for decrypting the second public key received by the second public key receiving section using the first secret key stored in the first storage section, a first public key encrypting section for encrypting the first public key stored in the first storage section using the second public key decrypted by the second public key decrypting section, and a first public key transmitting section for transmitting the first public key encrypted by the first public key encrypting section to the on-vehicle authentication device via the network, the on-vehicle authentication device further comprises: a first public key receiving section for receiving the encrypted first public key from the communication device, a first public key decrypting section for decrypting the first public key received by the first public key receiving section using the second secret key stored in the second storage section, and a first public key determination section for determining whether the first public key decrypted by the first public key decrypting section is authentic, and the on-vehicle authentication device authenticates that the communication device is an authentic device in the case that the first public key determination section has determined that the first public key is authentic.

Moreover, the on-vehicle authentication system according to another aspect of the present disclosure, wherein the second storage section of the on-vehicle authentication device stores a common key to be used for communication inside the vehicle via the network, the on-vehicle authentication device comprises: a common key encrypting section for encrypting the common key stored in the second storage section using the first public key having been determined to be authentic by the first public key determination section and a common key transmitting section for transmitting the common key encrypted by the common key encrypting section to the communication device via the network, the communication device comprises: a common key receiving section for receiving the encrypted common key from the on-vehicle authentication device and a common key decrypting section for decrypting the common key received by the common key receiving section using the first secret key stored in the first storage section, and the first storage section of the communication device stores the common key decrypted by the common key decrypting section.

Moreover, the on-vehicle authentication system according to another aspect of the present disclosure, wherein information in which the first public key attached with the electronic signature is made visible is drawn on the communication device or an attachment of the communication device, the system further comprises a visible information acquiring device for acquiring the information, and the on-vehicle authentication device acquires the first public key attached with the electronic signature on the basis of the information acquired by the visible information acquiring device.

Moreover, the on-vehicle authentication system according to another aspect of the present disclosure, comprising: a signature generation device comprising a storage section in which a signature generation key that is paired with the signature verification key is stored and a signature generation section for generating an electronic signature for the input first public key using the signature generation key stored in the storage section.

Moreover, the on-vehicle authentication system according to another aspect of the present disclosure, wherein the first public key acquiring section of the on-vehicle authentication device acquires the first public key attached with the electronic signature and also acquires an identification information of the communication device in which the first secret key to be paired with the first public key is stored, the on-vehicle authentication device stores the first public key attached with the electronic signature acquired by the first public key acquiring section in the second storage section so as to be associated with the identification information, the communication device comprises an identification information transmitting section that transmits the identification information thereof to the on-vehicle authentication device at the time when connected to the network, the on-vehicle authentication device comprises an identification information receiving section for receiving the identification information from the communication device, and the second public key encrypting section of the on-vehicle authentication device encrypts the second public key using the first public key associated with the identification information received by the identification information receiving section.

Moreover, a communication device according to another aspect of the present disclosure, connected to a network inside a vehicle, comprising: a storage section in which a first secret key and a first public key are stored, a second public key receiving section for receiving an encrypted second public key from an on-vehicle authentication device connected to the network, a second public key decrypting section for decrypting the second public key received by the second public key receiving section using the first secret key stored in the storage section, a first public key encrypting section for encrypting the first public key stored in the storage section using the second public key decrypted by the second public key decrypting section, and a first public key transmitting section for transmitting the first public key encrypted by the first public key encrypting section to the on-vehicle authentication device via the network.

Moreover, a communication device according to another aspect of the present disclosure, connected to a network inside a vehicle, comprising: a storage section in which a first secret key is stored, wherein information in which a first public key to be paired with the first secret key and an electronic signature indicating the authenticity of the first public key are made visible is drawn on a main body of the communication device or an attachment thereof.

Moreover, an on-vehicle authentication device according to another aspect of the present disclosure, for authenticating a communication device newly connected to a network inside a vehicle, comprising: a storage section in which a signature verification key for verifying the authenticity of the electronic signature attached to a first public key to be paired with a first secret key stored in the communication device, a second secret key and a second public key are stored, a first public key acquiring section for acquiring the first public key attached with the electronic signature, a signature verification section for performing verification using the signature verification key stored in the storage section, a second public key encrypting section for encrypting the second public key stored in the storage section using the first public key attached with the electronic signature having been determined to be authentic by the signature verification section, a second public key transmitting section for transmitting the second public key encrypted by the second public key encrypting section to the communication device via the network, a first public key receiving section for receiving the encrypted first public key from the communication device, a first public key decrypting section for decrypting the first public key received by the first public key receiving section using the second secret key stored in the storage section, and a first public key determination section for determining whether the first public key decrypted by the first public key decrypting section is authentic, and authenticating that the communication device is an authentic device in the case that the first public key determination section has determined that the first public key is authentic.

Moreover, a non-transitory recording medium according to another aspect of the present disclosure, for making to a computer having a storage section in which a first secret key and a first public key are stored: receive an encrypted second public key from an on-vehicle authentication device connected to a network inside a vehicle, decrypt the received second public key using the first secret key stored in the storage section, encrypt the first public key stored in the storage section using the decrypted second public key, and transmit the encrypted first public key to the on-vehicle authentication device via the network.

Moreover, a non-transitory recording medium according to another aspect of the present disclosure, for making a computer having a storage section in which a signature verification key for verifying the authenticity of an electronic signature attached to a first public key to be paired with a first secret key stored in a communication device connected to a network inside a vehicle, a second secret key and a second public key are stored, acquire the first public key attached with the electronic signature, verify the authenticity of the electronic signature attached to the acquired first public key using the signature verification key stored in the storage section, encrypt the second public key stored in the storage section using the first public key attached with the electronic signature having been determined to be authentic by the verification, transmit the encrypted second public key to the communication device via the network, receive the encrypted first public key from the communication device, decrypt the received first public key using the second secret key stored in the storage section, determine whether the decrypted first public key is authentic, and authenticate that the communication device is an authentic device in the case that the first public key has been determined to be authentic.

Moreover, a method for authenticating a communication device according to another aspect of the present disclosure, comprising: storing a first secret key and a first public key in the first storage section of a communication device connected to the network inside a vehicle, storing a second secret key, a second public key and a signature verification key for verifying the authenticity of the electronic signature attached to the first public key in the second storage section of an on-vehicle authentication device, acquiring, by the on-vehicle authentication device, the first public key attached with the electronic signature; verifying the authenticity of the electronic signature attached to the acquired first public key using the signature verification key stored in the second storage section; encrypting the second public key stored in the second storage section using the first public key attached with the electronic signature having been determined to be authentic by the verification; and transmitting the encrypted second public key to the communication device via the network, receiving, by the communication device, the encrypted second public key from the on-vehicle authentication device; decrypting the received second public key using the first secret key stored in the first storage section; encrypting the first public key stored in the first storage section using the decrypted second public key; and transmitting the encrypted first public key to the on-vehicle authentication device via the network, and receiving, by the on-vehicle authentication device, the encrypted first public key from the communication device; decrypting the received first public key using the second secret key stored in the second storage section; determining the authenticity of the decrypted first public key; and authenticating that the communication device is an authentic device in the case that the first public key has been determined to be authentic.

Moreover, a method for authenticating a communication device according to another aspect of the present disclosure, comprising: generating, by a signature generation device, the electronic signature of a first public key, writing, by an information writing device, the first public key and a first secret key to be paired with the first public key in a first storage section of a communication device connected to a network inside a vehicle, printing, by a printing device, information in which the first public key attached with the electronic signature is made visible on the communication device or an attachment of the communication device, writing, by an information writing device, a second secret key, a second public key and a signature verification key for verifying the authenticity of the electronic signature attached to the first public key in a second storage section of the on-vehicle authentication device, acquiring, by a visible information acquiring device, the printed information, acquiring, by the on-vehicle authentication device, the first public key attached with the electronic signature on the basis of the information acquired by the visible information acquiring device; verifying the authenticity of the electronic signature attached to the acquired first public key using the signature verification key stored in the second storage section; encrypting the second public key stored in the second storage section using the first public key attached with the electronic signature having been determined to be authentic by the verification; and transmitting the encrypted second public key to the communication device via the network, receiving, by the communication device, the encrypted second public key from the on-vehicle authentication device; decrypting the received second public key using the first secret key stored in the first storage section; encrypting the first public key stored in the first storage section using the decrypted second public key; and transmitting the encrypted first public key to the on-vehicle authentication device via the network, and receiving, by the on-vehicle authentication device, the encrypted first public key from the communication device; decrypting the received first public key using the second secret key stored in the second storage section; determining the authenticity of the decrypted first public key; and authenticating that the communication device is an authentic device in the case that the first public key has been determined to be authentic.

Moreover, a method for manufacturing a communication device according to another aspect of the present disclosure, comprising: generating, by a signature generation device, the electronic signature of a first public key, writing, by an information writing device, the first public key and a first secret key to be paired with the first public key in a first storage section of a communication device connected to a network inside a vehicle, and printing, by a printing device, information in which the first public key attached with the electronic signature is made visible on the communication device or an attachment of the communication device.

In the present disclosure, the on-vehicle authentication device mounted on the vehicle authenticates a communication device newly connected to the network inside the vehicle (more specifically, determines whether the communication device is an authentic device).

The communication device stores the first secret key and the first public key. The on-vehicle authentication device stores the second secret key, the second public key and the signature verification key for verifying whether the electronic signature is authentic. Since the communication device and the on-vehicle authentication device are not required to preliminarily store common key information, such common key information is not handled after the manufacturing of each device, whereby the common key information does not leak. With the method according to the present disclosure, the key information is preliminarily stored in the manufacturing stage of each device.

First, the on-vehicle authentication device acquires the first public key of the communication device newly connected to the network inside the vehicle. Since no problem occurs even if the public key is leaked outside, any methods may be used as a method for acquiring the first public key performed by the on-vehicle authentication device. However, the electronic signature is attached to the first public key, and the on-vehicle authentication device verifies whether the first public key acquired using the preliminarily stored signature verification key is authentic. In the case that the first public key is authentic, the on-vehicle authentication device encrypts the second public key stored therein using the first public key and transmits the encrypted second public key to the newly connected communication device via the network inside the vehicle. The second public key transmitted at this time can be decrypted only by the communication device having the first secret key that is paired with the first public key having been used for the encryption.

Upon receiving the encrypted second public key from the on-vehicle authentication device, the communication device decrypts the second public key using the first secret key stored therein. The communication device encrypts the first public key stored therein using the second public key and transmits the encrypted first public key to the on-vehicle authentication device via the network inside the vehicle. The first public key transmitted at this time can be decrypted only by the on-vehicle authentication device having the second secret key that is paired with the second public key having been used for the encryption.

Upon receiving the encrypted first public key from the communication device, the on-vehicle authentication device decrypts the first public key using the second secret key stored therein and determines whether the decrypted first public key is authentic. At this time, in the case that, for example, the decrypted first public key coincides with the first public key attached with the electronic signature, the on-vehicle authentication device can be configured so as to determine that the first public key is authentic. In the case of determining that the first public key is authentic, the on-vehicle authentication device determines that the communication device serving as the transmission source of the first public key is an authentic device.

As described above, in the on-vehicle authentication system according to the present disclosure, for the authentication of the communication device newly connected to the network inside the vehicle, the on-vehicle authentication device is not required to communicate with a server device or the like outside the vehicle. Furthermore, since the first secret key and the second secret key that should be prevented from leaking may merely be preliminarily written in the memories of the respective devices, for example, at the manufacturing stages of the respective devices, the worker who connects the communication device does not require to handle the first secret key and the second secret key, whereby it is possible to prevent a malicious worker from illegally acquiring the first secret key and the second secret key.

Moreover, in the present disclosure, the on-vehicle authentication device stores the common key to be used for the communication via the network inside the vehicle and performs processing for transmitting the common key to the new communication device having been determined to be authentic. The common key is a common-use key that is shared by all the devices connected to the network inside the vehicle, and the common key is used, for example, to perform processing for encrypting and decrypting information to be transmitted and received or to perform processing for generating and authenticating the message authenticator.

The on-vehicle authentication device encrypts the common key using the first public key of the communication device and transmits the encrypted common key to the communication device. Upon receiving the encrypted common key, the communication device decrypts the common key using the first secret key stored therein. After this, the communication device can communicate with the other devices connected to the network inside the vehicle using the common key.

What's more, in the present disclosure, information in which the first public key attached with the electronic signature is made visible, for example, visible information formed of an image, such as a two-dimensional bar code or a QR code (registered trademark), or a character string of numerals or characters, is generated, and the visible information is drawn (printed) on the main body of the communication device or on an attachment or the like of the communication device. In the case that the visible information is drawn on the main body of the communication device, the visible information can be drawn, for example, on the exterior part covering the communication device. As an attachment of the communication device for example, the box in which the communication device is packed, the package or the operation manual can be used.

When the communication device is connected to the network inside the vehicle, the visible information drawn on the main body of the communication device or the attachment thereof is acquired using the visible information acquiring device. The acquired visible information is converted into information including the first public key attached with the electronic signature, whereby the on-vehicle authentication device can acquire the first public key attached with the electronic signature. The conversion from the visible information to the first public key may be performed by the visible information acquiring device or the on-vehicle authentication device.

Still further, in the present disclosure, the signature generation device generates the electronic signature of the first public key of the communication device. The signature generation device has stored the signature generation key that is paired with the signature verification key stored in the on-vehicle authentication device and generates the electronic signature of the first public key of the communication device using the signature generation key. The signature generation device generates the signature, for example, before the manufacturing stage of the communication device, and the above-mentioned visible information is printed on the basis of the first public key attached with the generated electronic signature in the manufacturing process of the communication device.

Furthermore, in the present disclosure, when acquiring the first public key attached with the electronic signature from the communication device, the on-vehicle authentication acquires the identification information of the communication device. For example, the identification information of the communication device is configured so as to be acquired by the on-vehicle authentication device via the visible information acquiring device as the visible information together with the first public key attached with the electronic signature. The on-vehicle authentication device stores the first public key so as to be associated with the identification information of the communication device. When connected to the network inside the vehicle, the communication device transmits its own identification information to the on-vehicle authentication device. Upon receiving this identification information, the on-vehicle authentication device encrypts its own second public key using the first public key associated with the received identification information and transmits the encrypted second public key to the communication device. Consequently, the on-vehicle authentication device can acquire the first public keys relating to the plurality of communication devices and can authenticate the plurality of communication devices in parallel.

Advantageous Effects

With an aspect of the present disclosure, the on-vehicle authentication device can determine whether the communication device connected to the network inside the vehicle is an authentic device without requiring the on-vehicle authentication device and the communication device to communicate with devices outside the vehicle through wireless communication or the like, thereby being capable of reducing the possibility of leakage of highly confidential information.

The above and further objects and features will more fully be apparent from the following detailed description with accompanying drawings.

BRIEF DESCRIPTION OF THE DRAWINGS

FIG. 4 is a schematic view showing a configuration example of an ECU public key DB;

FIG. 12 is a flow chart showing the procedure for authentication processing performed by the gateway.

DETAILED DESCRIPTION

Configuration and Outline of the System

Figure 1:
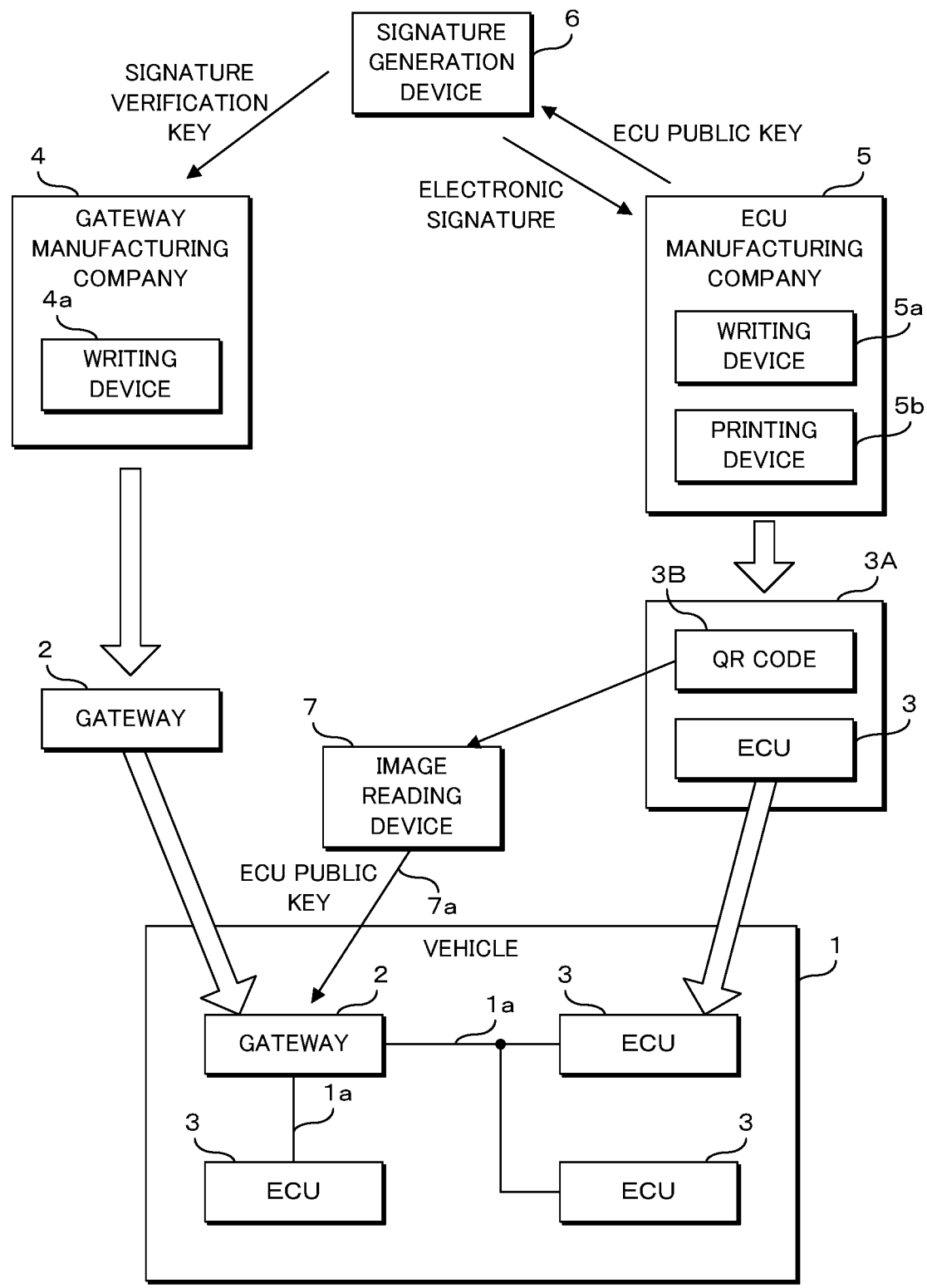
FIG. 1 is a schematic view illustrating an on-vehicle authentication system according to this embodiment.

FIG. 1 is a schematic view illustrating an on-vehicle authentication system according to this embodiment. The on-vehicle authentication system according to this embodiment is configured so that a plurality of communication lines 1a is connected to a gateway 2 mounted on a vehicle 1, one or more ECUs 3 are connected to the respective communication lines 1a, and each ECU 3 communicates with the other ECUs 3 via the communication lines 1a and the gateway 2, wherein, in the case that a new ECU 3 is connected to the communication line 1a, for example, in order to replace any one of the ECUs 3 or to add a new one, the gateway 2 determines whether this ECU 3 is an authentic device.

In the communication to be performed inside the vehicle 1 via the communication lines 1a, each of the gateway 2 and the ECUs 3 attaches a message authenticator to a message to be transmitted. Although this embodiment is configured so that a message authenticator is attached to a message, the configuration of this embodiment is not limited to this configuration. For example, an electronic signature may be attached to a message or, for example, a message may be encrypted and transmitted.

After receiving a message, each of the gateway 2 and the ECU 3 determines whether the message authenticator is authentic, and upon determining that the received message is not authentic, each of the gateway 2 and the ECU 3 performs processing for discarding the message. In order to generate a message authenticator and determine the authenticity of the message authenticator, all of the gateway 2 and the ECUs 3 have a common session key. For example, each of the gateway 2 and the ECUs 3 encrypts data included in a transmission message using the session key, thereby being capable of generating a message authenticator. Furthermore, after receiving a message, each of the gateway 2 and the ECUs 3 decrypts the message authenticator attached to the message using the session key and can determine whether the message is authentic depending on whether the decrypted data coincides with the data included in the message.

The section key is preliminarily written in the storage section of the gateway 2, for example, in the manufacturing process of the gateway 2 or is generated by the gateway 2. Although each ECU 3 has no session key in the initial state after factory shipment, after the ECU 3 is connected to the communication line 1a inside the vehicle 1, the ECU 3 acquires the session key transmitted from the gateway 2 and can transmit and receive messages to and from the other ECUs 3 inside the vehicle 1. Upon determining that an ECU 3 newly connected to the communication line 1a inside the vehicle 1 is an authentic device, the gateway 2 transmits the session key to this ECU 3.

The on-vehicle authentication system according to this embodiment adopts an authentication system for the ECUs 3 using a public key system cipher technology in order to safely transmit/receive the session key from the gateway 2 to the ECUs 3. In the public key system, a pair of a secret key and a public key is used; for example, information encrypted using the public key is decrypted using the secret key or, for example, an electronic signature generated using the secret key is verified using the public key. In the on-vehicle authentication system according to this embodiment, three pairs of keys are used: a pair of a GW (gateway) secret key and a GW public key for the gateway 2, a pair of an ECU secret key and an ECU public key for each ECU 3, and a pair of a signature generation key and a signature verification key for generating and verifying an electronic signature. The signature generation key is used as the secret key and the signature verification key is used as the public key.

A gateway manufacturing company 4 for, for example, manufacturing and selling the gateway 2, has preliminarily acquired the signature verification key required for the verification of an electronic signature. A signature generation device 6 for generating an electronic signature is, for example, a device managed and operated by the company manufacturing or selling the vehicle 1 and uses the signature generation key to generate an electronic signature. The signature verification key is paired with the signature generation key. The gateway manufacturing company 4 can preliminarily acquire the signature verification key distributed from the company for managing and operating the signature generation device 6. The gateway manufacturing company 4 writes a GW secret key, a GW public key and a signature verification key in the storage section of the gateway 2 using a writing device 4a in the manufacturing process of the gateway 2. In this embodiment, the storage section of the gateway 2 is provided with a special area in which the signature verification key is written. This area in which the signature verification key is written is an area in which data can be written only once. The signature verification key having been written in this area can never be rewritten thereafter. The manufactured gateway 2 is transported, for example, to the factory for manufacturing the vehicle 1 and mounted on the vehicle 1 at the manufacturing factory.

An ECU manufacturing company 5 for, for example, manufacturing and selling the ECUs 3, generates a pair of an ECU secret key and an ECU public key being different for each ECU to be manufactured using, for example, an in-house server device. The ECU manufacturing company 5 transmits the generated ECU public key to, for example, the company for managing and operating the signature generation device 6 and requests the generation of an electronic signature. In response to this request, an electronic signature is generated for each ECU public key using the signature generation device 6, and information (ECU public key certificate) about the ECU public key attached with the electronic signature is given to the ECU manufacturing company 5. The ECU manufacturing company 5 writes the ECU secret key and the ECU public key in the storage section of the ECU 3 using a writing device 5a in the manufacturing process of the ECU 3.

Furthermore, the ECU manufacturing company 5 converts the ECU public key attached with the electronic signature acquired from the signature generation device 6 and, for example, the ID of the ECU 3, in which the ECU secret key to be paired with the ECU public key is written, into a QR code (visible information) 3B. The ID of the ECU 3, such as the serial number thereof, is identification information uniquely assigned to the ECU 3. The ECU manufacturing company 5 prints the QR code 3B, for example, on the surface of a box 3A in which the ECU 3 is accommodated, using a printing device 5b, for example, in the manufacturing process of the ECU 3. After that, the manufactured ECU 3 is accommodated in the box 3A and shipped.

The shipped ECU 3 is installed in the vehicle 1, for example, in the manufacturing process of the vehicle 1, or installed on the vehicle 1, for example, at the dealer or the repair shop of the vehicle 1, for example, for replacement due to failure. In either case, before installing the ECU 3 in the vehicle 1, the worker who installs the ECU 3 in the vehicle 1 reads the QR code 3B printed on the box 3A accommodating the ECU 3 using an image reading device 7. The image reading device 7 converts the read QR code 3B into digital data, thereby acquiring information such as the ECU public key of the ECU 3, the electronic signature attached to the ECU public key and the ID of the ECU 3 in which the ECU public key is stored. The image reading device 7 can be detachably connected to the gateway 2, for example, via a communication cable 7a and gives information, such as the ECU public key, the electronic signature and the ID obtained by converting the QR code 3B, to the gateway 2. The gateway 2 determines whether the electronic signature attached to the ECU public key is authentic using the signature verification key preliminarily stored therein, thereby determining whether the ECU public key given from the image reading device 7 is authentic. In the case that the ECU public key is authentic, the gateway 2 stores the ECU public key and the electronic signature so as to be associated with the ID of the ECU 3.

Figure 2:
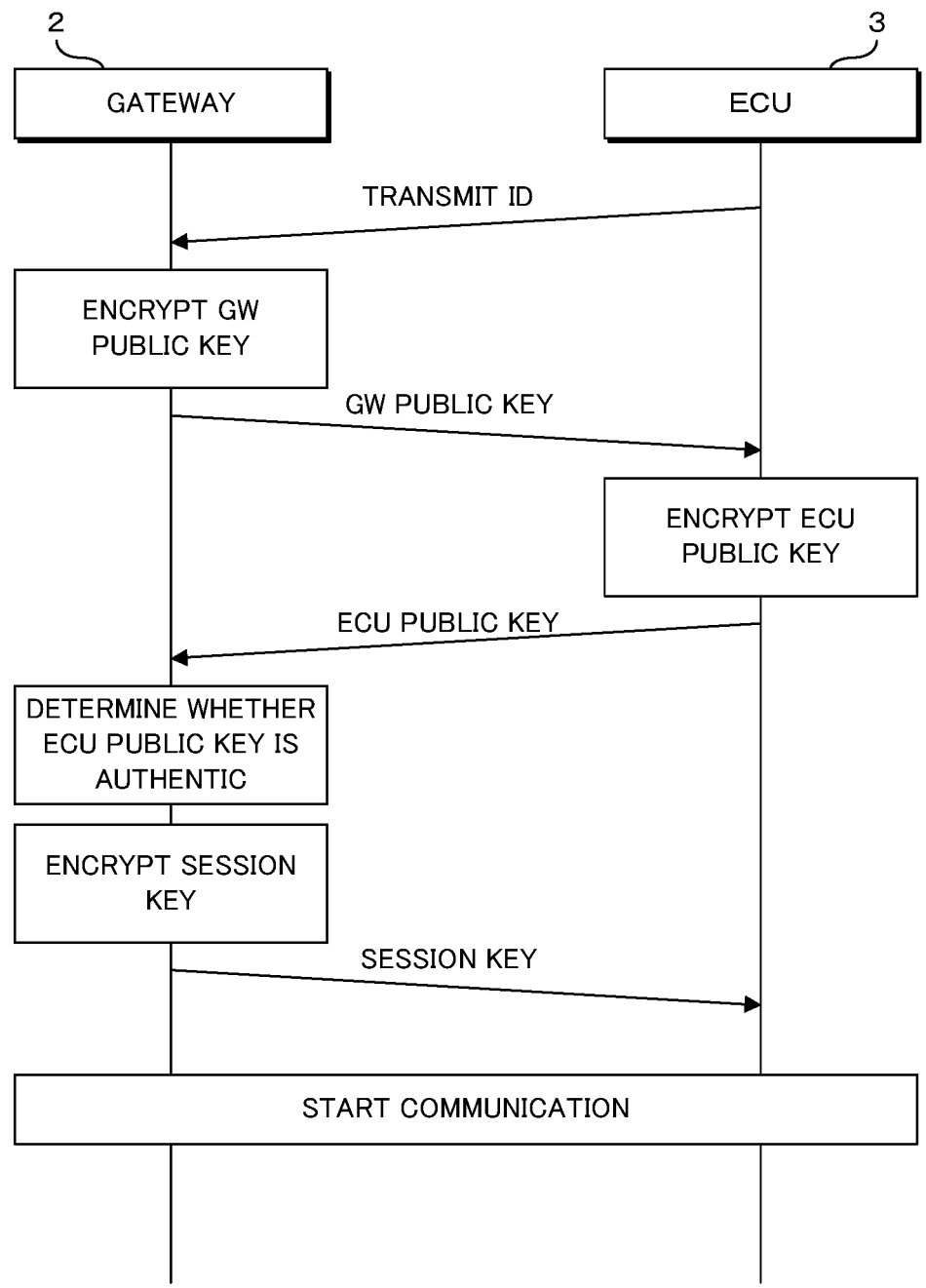
FIG. 2 is a schematic view illustrating the processing to be performed between a gateway and an ECU in order to transmit and receive a session key.

After that, in the case that the ECU 3 is connected to the communication line 1a of the vehicle 1, processing is performed according to a predetermined procedure between the ECU 3 and the gateway 2, and finally the session key is given from the gateway 2 to the ECU 3. FIG. 2 is a schematic view illustrating the processing to be performed between the gateway 2 and the ECU 3 in order to transmit and receive the session key. The ECU 3 connected to the communication line 1a of the vehicle 1 transmits its own ID to the gateway 2 via the communication line 1a. Since the ECU 3 does not have the session key at this time and the message authenticator is not attached to the message to be transported and received between the ECU 3 and the gateway 2, the gateway 2 permits communication without the message authenticator between the ECU 3 and the gateway 2 until the ECU 3 has the session key.

After receiving the ID from the ECU 3, the gateway 2 reads the ECU public key corresponding to the ID and encrypts the GW public key stored therein using the read ECU public key. The gateway 2 transmits the encrypted GW public key to the ECU 3. Upon receiving the encrypted GW public key, the ECU 3 decrypts the GW public key using the ECU secret key stored therein. The ECU 3 encrypts the ECU public key stored therein using the decrypted GW public key. The ECU 3 transmits the encrypted ECU public key to the gateway 2. Upon receiving the encrypted ECU public key, the gateway 2 decrypts the ECU public key using the GW secret key stored therein.

Consequently, the gateway 2 has the ECU public key acquired by reading the QR code 3B using the image reading device 7 and the ECU public key acquired from the ECU 3 connected to the communication line 1a via communication. The gateway 2 determines whether the two ECU public keys are identical, thereby determining whether the acquired ECU public key is authentic. In the case that the two ECU public keys are identical, the gateway 2 determines that the ECU public key is authentic and determines that the ECU 3 serving as the transmission source of the ECU public key is an authentic device.

Upon determining that the ECU 3 is an authentic device, the gateway 2 encrypts the session key stored therein using the ECU public key corresponding to the ECU 3. The gateway 2 transmits the encrypted session key to the ECU 3. Upon receiving the encrypted session key, the ECU 3 decrypts the session key using the ECU secret key stored therein. Consequently, the ECU 3 can acquire the session key and can generate and authenticate the message authenticator using the session key in the subsequent communication.

Device Configuration

Figure 3:
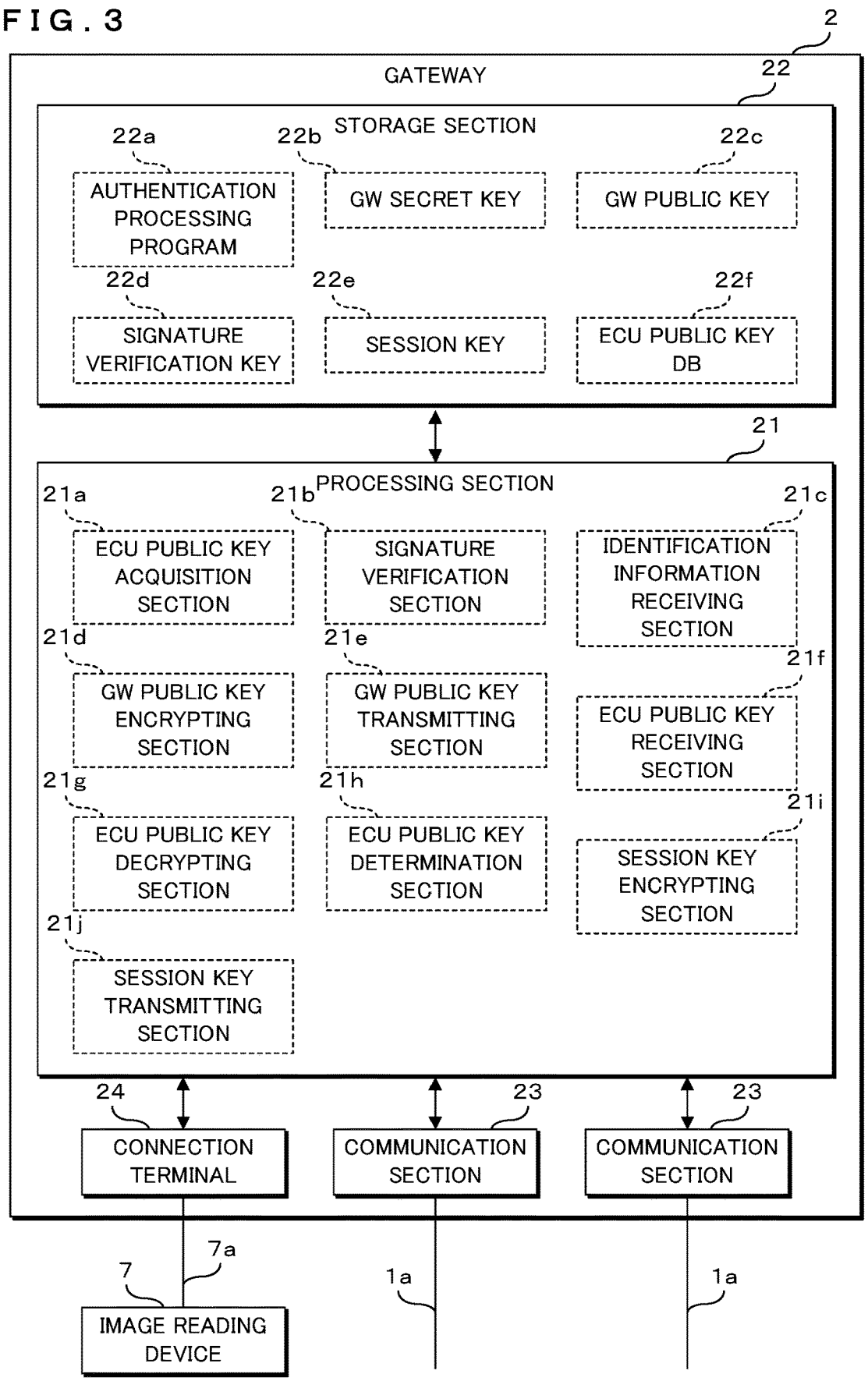
FIG. 3 is a block diagram showing a configuration of the gateway.

FIG. 3 is a block diagram showing a configuration of the gateway 2. In FIG. 3, function blocks relating to an ECU 3 authentication function are extracted from the functions of the gateway 2 and shown, and function blocks relating to the other functions such as a message relay function are not shown. The gateway 2 according to this embodiment is composed of, for example, a processing section (processor) 21, a storage section (storage) 22, communication sections (transceivers) 23 and a connection terminal (connector) 24. The processing section 21 is composed of an arithmetic processing device, such as a CPU (Central Processing Unit) or an MPU (Micro-Processing Unit) and can perform, for example, various operation processes and control processes, by reading and executing programs stored in the storage section 22. For example, the processing section 21 performs processing for relaying messages transmitted and received via the plurality of communication lines 1a provided inside the vehicle 1. Furthermore, the processing section 21 according to this embodiment performs processing for authenticating an ECU 3 newly connected to the communication line 1a by executing an authentication processing program 22a stored in the storage section 22.

The storage section 22 is composed of a nonvolatile memory device, such as a flash memory or an EEPROM (Electrically Erasable Programmable Read Only Memory). The storage section 22 stores programs to be executed by the processing section 21 and various kinds of data required for processing. In this embodiment, the storage section 22 stores the authentication processing program 22a for performing processing relating to the authentication of the ECU 3, a GW secret key 22b, a GW public key 22c, a signature verification key 22d and a session key 22e required for the processing to be executed by this program. Furthermore, the storage section 22 is provided with an ECU public key DB (database) 22f in which the ECU public keys for one or more ECUs 3 are stored.

The GW secret key 22b and the GW public key 22c of the storage section 22 are keys to be used as a pair to perform encryption and decryption in the public key system, and different values are set for each gateway 2. The signature verification key 22d is a key that is used to verify whether the electronic signature attached to the ECU public key of an ECU 3 is authentic and is paired with the signature generation key to be used by the signature generation device 6. As the signature verification key 22d, the same value is set to a plurality of gateways 2. The GW secret key 22b, the GW public key 22c and the signature verification key 22d are written in the storage section 22 by the writing device 4a of the gateway manufacturing company 4, for example, in the manufacturing process of the gateway 2.

In this embodiment, the signature verification key 22d stored in the storage section 22 is only allowed to be read and its value cannot be rewritten. In other words, the storage section 22 is provided with a storage area in which data can be written only once and the data can never be rewritten thereafter. Once written in this storage area of the storage section 22, the signature verification key 22d cannot be changed. The signature verification key 22d may be written in a memory device, such as a ROM (Read Only Memory), different from the storage section 22. Similarly, the keys such as the GW secret key 22b and the GW public key 22c, other than the signature verification key 22d may be made unchangeable.

The session key 22e is used to generate a message authenticator to be attached to a message to be transmitted and received via the network inside the vehicle 1, to determine whether the message authenticator is authentic and to perform encryption and decryption in a common key system. The gateway 2 and the ECUs 3 mounted on the vehicle 1 are required to have the same session key 22e. Although the session key 22e may be written in the storage section 22, for example, in the manufacturing process of the gateway 2, it is assumed that the gateway 2 generates the session key 22e, for example, using a random-number generating algorithm in this embodiment. The gateway 2 may, for example, periodically generate and update the session key 22e and transmit the updated session key 22e to all the ECUs 3 inside the vehicle 1.

The ECU public key DB 22f stores the ECU public keys of the ECUs 3 mounted on the vehicle 1. FIG. 4 is a schematic view showing a configuration example of the ECU public key DB 22f. In the ECU public key DB 22f of the storage section 22, an ID uniquely assigned to each ECU 3, the ECU public key of the ECU 3 and an electronic signature for verifying the authenticity of the ECU public key have been stored so as to be associated with one another. The gateway 2 acquires the information read by the image reading device 7 from the QR code 3B on the box 3A accommodating the ECU 3 and determines, on the basis of the electronic signature, whether the ECU public key included in the acquired information is authentic, and then upon determining that the electronic signature is authentic, the gateway 2 registers the above-mentioned information in the ECU public key DB 22f. Although this embodiment is configured so that the electronic signature of the ECU public key is stored, the configuration is not limited to this configuration; after the ECU public key has been determined to be authentic on the basis of the electronic signature, the electronic signature may be discarded.

The communication section 23 of the gateway 2 performs processing for transmitting and receiving messages to and from other devices via the communication lines 1a. The communication section 23 transmits and receives messages according to a communication protocol, such as CAN (Controller Area Network) or Ethernet (registered trademark). The communication section 23 converts a transmission message given from the processing section 21 into an electrical signal and outputs the electrical signal to the communication line 1a, thereby transmitting the message. The communication section 23 samples the electrical signal on the communication line 1a and acquires the sampled electrical signal, thereby receiving the message, and then gives the received message to the processing section 21. Furthermore, the gateway 2 is equipped with the plurality of communication sections 23, and message relay is performed so that a message received by one of the communication sections 23 is transmitted from another communication section 23. The determination as to whether the message is authentic on the basis of the message authenticator attached to the message is performed by the processing section 21 instead of the communication section 23.

The connection terminal 24 is a terminal to which the communication cable 7a can be detachably connected, and a terminal conforming to the OBD (On Board Diagnostics) or USB (Universal Serial Bus) standard can be adopted. In this embodiment, the image reading device 7 can be connected to the connection terminal 24 via the communication cable 7a. The gateway 2 can acquire data that is obtained by reading the QR code 3B printed on the box 3A accommodating the ECU 3. The gateway 2 can acquire, from the image reading device 7 connected to the connection terminal 24, the data that is obtained by reading the QR code 3B printed on the box 3A accommodating the ECU 3.

Still further, in the processing section 21 of the gateway 2 according to this embodiment, for example, an ECU public key acquisition section 21a, a signature verification section 21b, an identification information receiving section 21c, a GW public key encrypting section 21d, a GW public key transmitting section 21e, an ECU public key receiving section 21f, an ECU public key decrypting section 21g, an ECU public key determination section 21h, a session key encrypting section 21i and a session key transmitting section 21j are implemented as software-like function blocks by executing the authentication processing program 22a stored in the storage section 22.

The ECU public key acquisition section 21a acquires, from the image reading device 7 connected to the connection terminal 24 via the communication cable 7a, the data that is obtained by reading the QR code 3B printed on the box 3A of the ECU 3, thereby performing processing for acquiring the ECU public key of the ECU 3 together with information, such as the ID and the electronic signature. The signature verification section 21b verifies whether the electronic signature attached to the ECU public key acquired by the ECU public key acquisition section 21a is authentic, thereby performing processing for verifying whether the ECU public key is authentic. For example, the signature verification section 21b can be configured so as to determine whether the electronic signature is authentic by decrypting the electronic signature using the signature verification key 22d stored in the storage section 22 and by determining whether the decrypted data coincides with part or whole of the ECU public key. The signature verification key 22d registers the ECU public key, to which the authentic electronic signature is determined to be attached, in the ECU public key DB 22f.

In the case that a new ECU 3 is connected to the communication line 1a of the vehicle 1, the identification information receiving section 21c performs processing for receiving, via the communication section 23, an authentication request transmitted from the new ECU 3 and the ID of the ECU 3 transmitted together with this authentication request. In the case that the identification information receiving section 21c has received the authentication request and the ID from the ECU 3, the GW public key encrypting section 21d reads the ECU public key associated with the received ID from the ECU public key DB 22f of the storage section 22 and encrypts the GW public key 22c stored in the storage section 22 using the read ECU public key. The GW public key transmitting section 21e transmits the GW public key 22c encrypted by the GW public key encrypting section 21d to the ECU 3 from which the authentication request is transmitted (that is, to the communication line 1a to which the ECU 3 is connected).

The ECU public key receiving section 21f receives the ECU public key of the ECU 3 that is transmitted from the ECU 3 in response to the transmission of the GW public key 22c by the GW public key transmitting section 21e via the communication section 23. Since the received ECU public key is encrypted using the GW public key, the ECU public key decrypting section 21g reads the GW secret key 22b from the storage section 22 and decrypts the ECU public key received from the ECU 3 using the read GW secret key 22b. The ECU public key determination section 21h compares the ECU public key decrypted by the ECU public key decrypting section 21g with the ECU public key obtained by the ECU public key acquisition section 21a and registered in the ECU public key DB 22f and determines whether the two ECU public keys coincide with each other, thereby determining whether the ECU public key received from the new ECU 3 is authentic. In the case that the ECU public key determination section 21h determines that the ECU public key is authentic, the gateway 2 determines that the ECU 3 serving as the transmission source of the ECU public key is an authentic device (that is to say, authenticates this ECU 3).

The session key encrypting section 21i encrypts the session key 22e stored in the storage section 22 using the ECU public key that is determined to be authentic by the ECU public key determination section 21h. The session key encrypting section 21i transmits the session key 22e encrypted by the session key encrypting section 21i to the ECU 3 that is determined to be authentic. Consequently, the ECU 3 newly connected to the communication line 1a of the vehicle 1 can acquire the session key 22e to be used for communication inside the vehicle 1, and in the subsequent communication, the message authenticator generated using the session key 22e can be attached to transmission messages.

Figure 5:
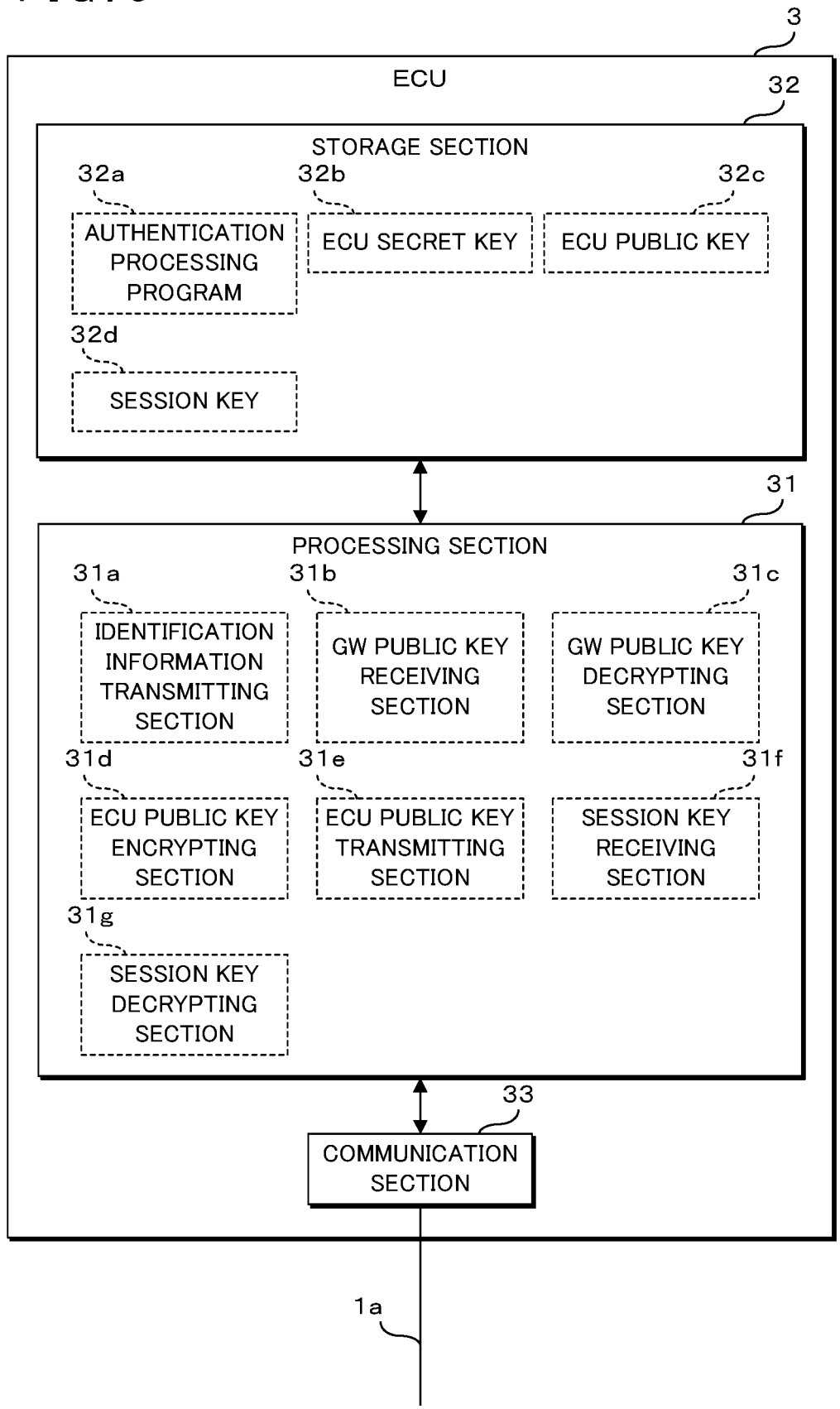
FIG. 5 is a block diagram showing a configuration of the ECU.

FIG. 5 is a block diagram showing a configuration of the ECU 3. In FIG. 5, common function blocks relating to the ECU 3 authentication function are extracted from the functions of the plurality of ECUs 3 mounted on the vehicle 1 and shown, and function blocks, for example, relating to control processing functions for each ECU 3 are not shown. The ECU 3 according to this embodiment is equipped with, For example, a processing section (processor) 31, a storage section (storage) 32 and a communication section (transceiver) 33. The processing section 31 is composed of an arithmetic processing device, such as a CPU or an MPU, reads and executes programs stored in the storage section 32, thereby being capable of performing various kinds of operation processing and control processing. In this embodiment, the processing section 31 executes an authentication processing program 32a stored in the storage section 32, thereby performing processing relating to the authentication of the ECU 3 between the processing section 31 and the gateway 2.

The storage section 32 is composed of a nonvolatile memory device, such as a flash memory or an EEPROM. The storage section 32 stores programs to be executed by the processing section 31 and various kinds of data required for processing. In this embodiment, the storage section 32 stores the authentication processing program 32a for performing processing relating to the authentication of the ECU 3, an ECU secret key 32b, an ECU public key 32c and a session key 32d required for the processing to be executed by this program. The ECU secret key 32b and the ECU public key 32c of the storage section 32 are keys to be used as a pair to perform encryption and decryption in the public key system, and different values are set for each ECU 3. The ECU secret key 32b and the ECU public key 32c are written in the storage section 32 by the writing device 5a of the ECU manufacturing company 5, for example, in the manufacturing process of the ECU 3.

The session key 32d is used to generate a message authenticator to be attached to a message to be transmitted and received via the network inside the vehicle 1, to determine whether the message authenticator is authentic and to perform encryption and decryption in the common key system. The gateway 2 and the ECUs 3 mounted on the vehicle 1 are required to have the same session key. The session key 32d is not written in the manufacturing process of the ECU 3; after the ECU 3 is mounted on the vehicle 1, the ECU 3 receives the session key 32d transmitted from the gateway 2, and the received session key 32d is written in the storage section 32.

The communication section 33 performs processing for transmitting and receiving messages to and from other devices via the communication lines 1a. The communication section 33 transmits and receives messages according to a communication protocol, such as CAN or Ethernet. The communication section 33 converts a transmission message given from the processing section 31 into an electrical signal and outputs the electrical signal to the communication line 1a, thereby transmitting the message. The communication section 33 samples the electrical signal on the communication line 1a and acquires the sampled electrical signal, thereby receiving the message, and then gives the received message to the processing section 31. The determination as to whether the message is authentic on the basis of the message authenticator attached to the message is performed by the processing section 31 instead of the communication section 33.

Still further, in the processing section 31 of the ECU 3 according to this embodiment, for example, an identification information transmitting section 31a, a GW public key receiving section 31b, a GW public key decrypting section 31c, an ECU public key encrypting section 31d, an ECU public key transmitting section 31e, a session key receiving section 31f and a session key decrypting section 31g are implemented as software-like function blocks by executing the authentication processing program 32a stored in the storage section 32. In the case that an ECU 3 is newly connected to the communication line 1a of the vehicle 1, the identification information transmitting section 31a performs processing for transmitting the ID of the ECU 3 together with an authentication request to the gateway 2 mounted on the vehicle 1. The identification information transmitting section 31a may automatically transmit the authentication request and the ID to the gateway 2, for example, in the case that the session key 32d is not stored in the storage section 32 after the start of the ECU 3, or the identification information transmitting section 31a may transmit the authentication request and the ID, for example, according to the operation of the worker who mounted the ECU 3 on the vehicle 1.

The GW public key receiving section 31b performs processing for receiving the GW public key transmitted from the gateway 2 via the communication section 33 in response to the authentication request and the ID transmitted from the identification information transmitting section 31a. The GW public key has been encrypted by the ECU public key of the ECU 3. The GW public key decrypting section 31c decrypts the GW public key received by the GW public key receiving section 31b using the ECU secret key 32b stored in the storage section 32. The ECU public key encrypting section 31d encrypts the ECU public key 32c stored in the storage section 32 using the GW public key decrypted by the GW public key decrypting section 31c. The ECU public key transmitting section 31e transmits the ECU public key 32c encrypted by the ECU public key encrypting section 31d to the gateway 2 via the communication section 33.

In the case that the gateway 2 having received the ECU public key from the ECU 3 determines that the received ECU public key is authentic and that the ECU 3 is an authentic device, the gateway 2 transmits the session key stored therein to the ECU 3. The session key receiving section 31f of the ECU 3 receives the session key transmitted from the gateway 2 via the communication section 33. Since this session key is encrypted using the ECU public key by the gateway 2, the session key decrypting section 31g decrypts the session key using the ECU secret key 32b stored in the storage section 32 and stores the decrypted session key 32d in the storage section 32. Consequently, the ECU 3 newly connected to the communication line 1a of the vehicle 1 can store, in the storage section 32, the session key 32d to be used for communication inside the vehicle 1, can attach the message authenticator generated using the session key 32d stored in the storage section 32 to transmission messages in the subsequent communication, and can receive messages attached with the message authenticator.

Figure 6:
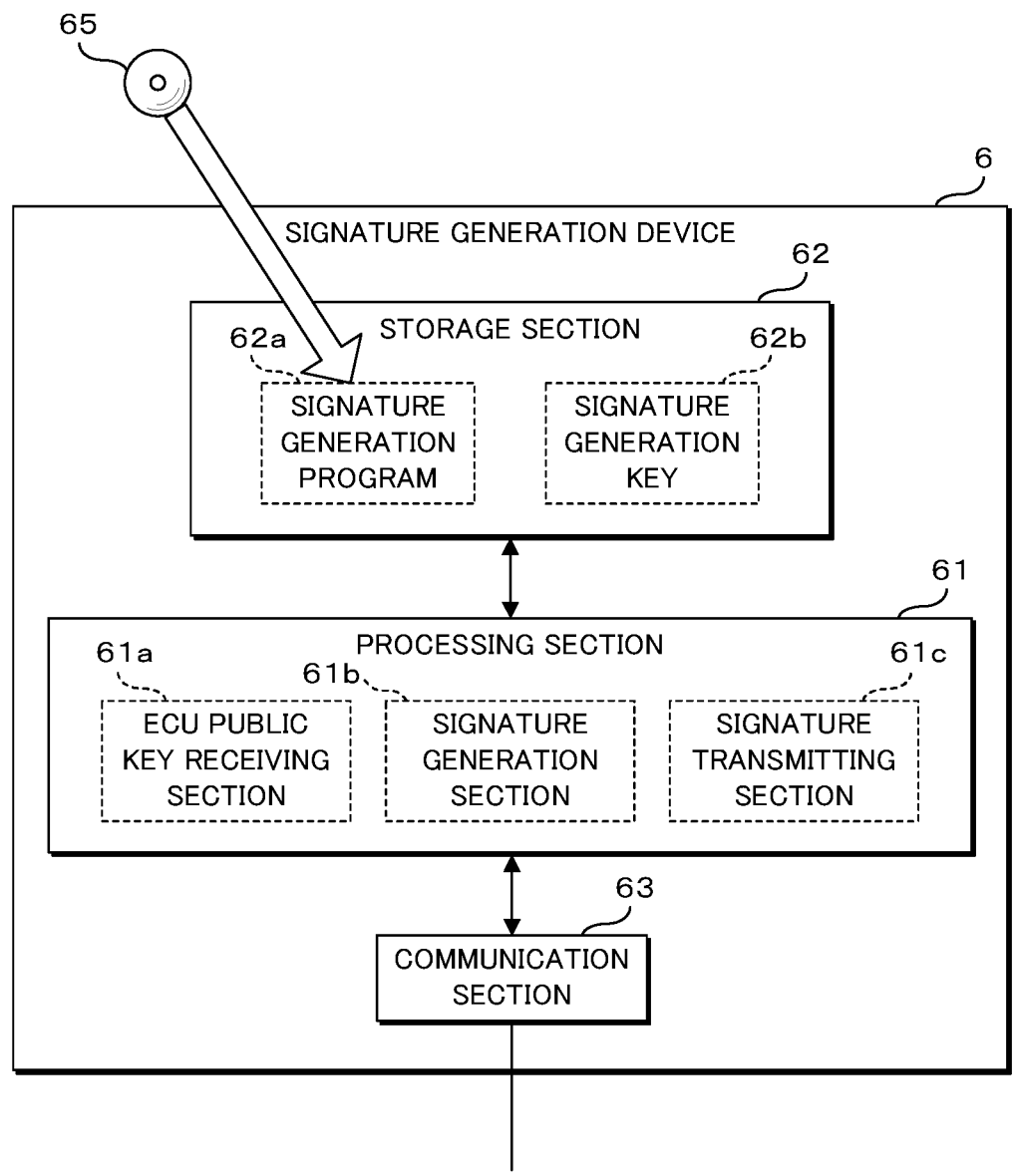
FIG. 6 is a block diagram showing a configuration of a signature generation device.

FIG. 6 is a block diagram showing a configuration of the signature generation device 6. The signature generation device 6 according to this embodiment is implemented as a server device managed and operated, for example, by the company manufacturing or selling the vehicle 1. However, the signature generation device 6 may be a device managed and operated, for example, by a company providing signature generation service, the company manufacturing the gateway 2 or the company manufacturing the ECU 3. Furthermore, the signature generation device 6 is implemented by installing a signature generation program 62a in a general-purpose computer. The signature generation program 62a is recorded on a recording medium 65, such as an optical disc or a memory card, distributed and read from the recording medium 65 by a computer and then installed in a hard disk or the like.

The signature generation device 6 according to this embodiment is equipped with, for example, a processing section 61, a storage section 62 and a communication section 63. The processing section 61 is composed of an arithmetic processing device, such as a CPU or an MPU, reads and executes programs stored in the storage section 62, thereby being capable of performing various kinds of operation processing. In this embodiment, the processing section 61 executes the signature generation program 62a stored in the storage section 62, thereby performing processing for generating an electronic signature for verifying the authenticity of given data.

The storage section 62 is composed of a large capacity storage device, such as a hard disk. The storage section 62 stores, for example, programs to be executed by the processing section 61 and various kinds of data required for processing. In this embodiment, the storage section 62 stores the signature generation program 62a for performing processing relating to the generation of an electronic signature and a signature generation key 62b required for processing by this program. The signature generation key 62b is paired with the signature verification key 22d stored in the gateway 2 and is used to encrypt predetermined data in order to generate an electronic signature.

The communication section 63 performs processing for transmitting and receiving messages to and from other devices, for example, via a wide area network, such as the Internet. In this embodiment, the communication section 63 transmits and receives messages according to a communication protocol, such as the Ethernet, for example, between the communication device installed in the gateway manufacturing company and the communication device installed in the ECU manufacturing company 5. The communication section 63 transmits a transmission message given from the processing section 61 to another device and gives a message received from another device to the processing section 61. In this embodiment, the signature generation device 6 may transmit the signature verification key 22d stored in the gateway 2 to the communication device of the gateway manufacturing company 4. Furthermore, the signature generation device 6 receives the ECU public key together with a signature generation request from the ECU manufacturing company 5, generates an electronic signature for verifying the authenticity of the received ECU public key and transmits the electronic signature to the ECU manufacturing company 5.

Still further, in the processing section 61 of the signature generation device 6 according to this embodiment, for example, an ECU public key receiving section 61a, a signature generation section 61b and a signature transmitting section 61c are implemented as software-like function blocks by executing the signature generation program 62a stored in the storage section 62. The ECU public key receiving section 61a performs processing for receiving the signature generation request and the ECU public key transmitted, for example, from the communication device of the ECU manufacturing company 5 via the communication section 63. The signature generation section 61b generates an electronic signature for the ECU public key for which signature generation is requested using the signature generation key 62b of the storage section 62. The signature transmitting section 61c performs processing for transmitting information including the electronic signature generated by the signature generation section 61b to the communication section of the ECU manufacturing company 5 serving as the transmission source of the signature generation request and the ECU public key.

Since the signature generation processing performed by the signature generation device 6 using the signature generation key 62b is an existing technology, the detailed description thereof is omitted. Furthermore, since the signature authentication processing performed by the gateway 2 using the signature verification key 22d is an existing technology, the detailed description thereof is omitted. Similarly, since the detailed procedures for encrypting and decrypting information using the secret key and the public key, the procedure for encrypting and decrypting information using the common key (session key) and the procedure for performing communication using the message authenticator generated by the session key are existing technologies, the detailed descriptions thereof are omitted.

Figure 7:
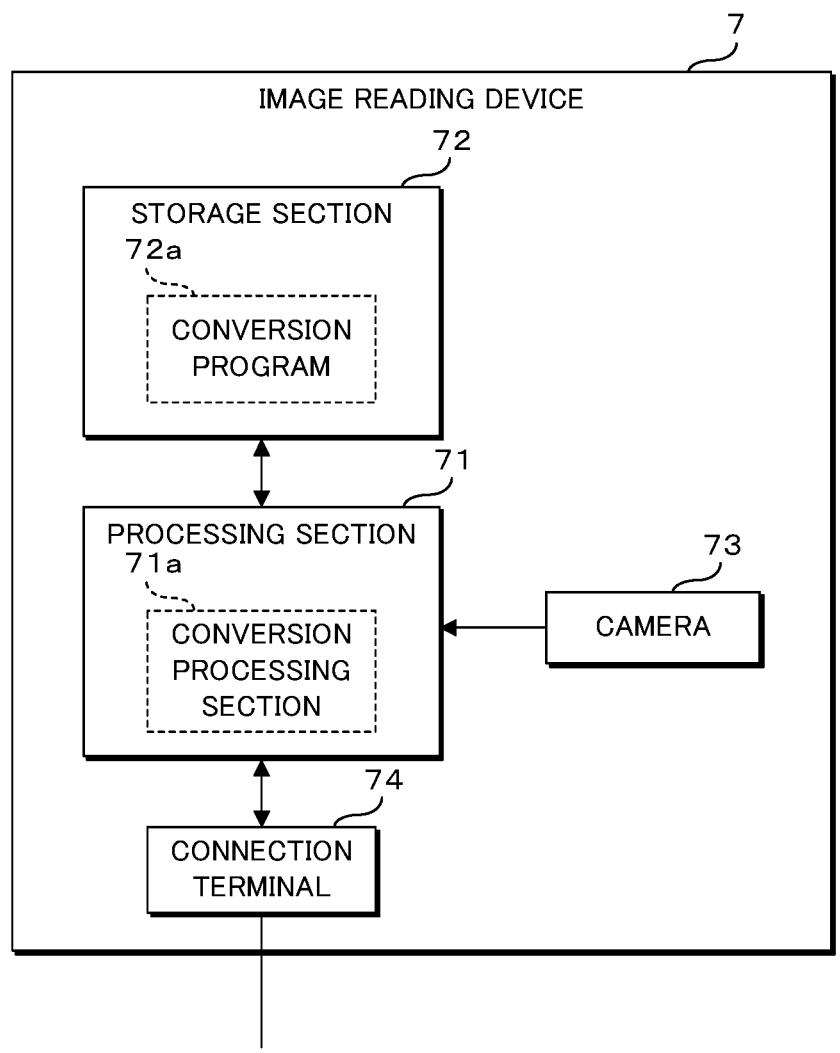
FIG. 7 is a block diagram showing a configuration of an image reading device.

FIG. 7 is a block diagram showing a configuration of the image reading device 7. The image reading device 7 according to this embodiment is provided, for example, at the dealer or the repair shop of the vehicle 1 and is a device having a size and a shape so as to be portable by the worker who maintains or repairs the vehicle 1. The image reading device 7 may be a special-purpose device for, for example, maintaining and repairing the vehicle 1, such as installing the ECU 3 or may be a device, for example, a general-purpose personal computer or a tablet terminal device in which programs having functions for reading images and communicating with the vehicle 1 are installed.

The image reading device 7 according to this embodiment is equipped with, for example, a processing section 71, a storage section 72, a camera 73 and a connection terminal 74. The processing section 71 is composed of an arithmetic processing device, such as a CPU or an MPU, reads and executes programs stored in the storage section 72, thereby being capable of performing various kinds of operation processing. In this embodiment, the processing section 71 executes a conversion program 72a stored in the storage section 72, thereby performing processing for reading the QR code 3B and converting the code into information.

The storage section 72 is composed of a nonvolatile memory device, such as a flash memory or an EEPROM. The storage section 72 stores programs to be executed by the processing section 71 and various kinds of data required for processing. In this embodiment, the storage section 72 stores the conversion program 72a for performing processing for reading the QR code 3B printed on the box 3A of the ECU 3 and for converting the code into information and also stores information required for the processing performed by the program.

The camera 73 is a camera photographing the QR code 3B printed on the box 3A of the ECU 3. The camera performs photographing, for example, according to the operation of the user on the photographing button provided at an appropriate place on the image reading device 7 and gives an image obtained by the photographing to the processing section 71. The connection terminal 74 is a terminal to which the communication cable 7a can be detachably connected, and a terminal conforming to the OBD or USB standard can be adopted. In this embodiment, one end of the communication cable 7a is connected to the connection terminal 74 and the other end of the communication cable 7a is connected to the gateway 2, whereby the gateway 2 and the image reading device 7 can communicate with each other.

Furthermore, the processing section 71 of the image reading device 7 according to this embodiment executes the conversion program 72a stored in the storage section 72, whereby, for example, a conversion processing section 71a is implemented as a software-like function block. The conversion processing section 71a extracts the QR code 3B from the image photographed by the camera 73 and performs processing for converting the extracted QR code 3B into digital data, for example, data such as the ID of the ECU 3, the ECU public key and the electronic signature, in this embodiment. Since the processing for converting the QR code 3B into the digital data is an existing technology, the detailed description thereof is omitted. The data converted by the conversion processing section 71a is transmitted to the gateway 2 that is connected to the connection terminal 74 via the communication cable 7a.

ECU Manufacturing Method

Figure 8:
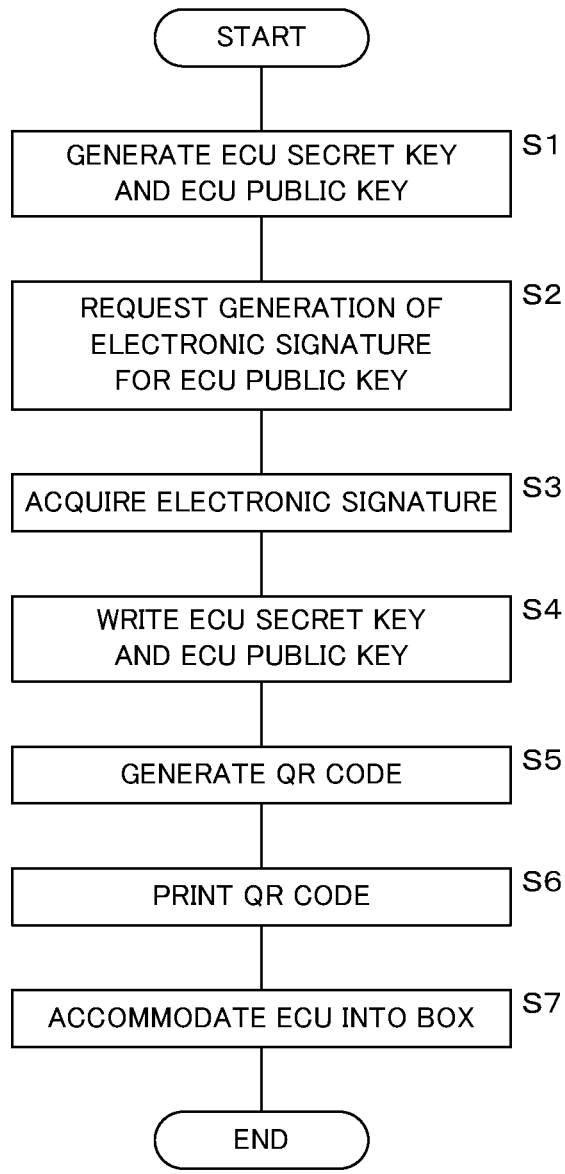
FIG. 8 is a flow chart illustrating the method for manufacturing the ECU performed at an ECU manufacturing company.

Next, a method for manufacturing the ECU 3 performed at the ECU manufacturing company 5 will be described below. FIG. 8 is a flow chart illustrating the method for manufacturing the ECU 3 performed at the ECU manufacturing company 5. The ECU manufacturing company 5 first generates an ECU secret key and an ECU public key for each ECU 3 to be manufactured (at step S1). The ECU secret key and the ECU public key for each ECU 3 are generated, for example, using a computer provided in the ECU manufacturing company 5. Next, the ECU manufacturing company 5 communicates with the signature generation device 6 via a network, such as the Internet, and requests the generation of an electronic signature for the ECU public key generated at step S1 (at step S2). In response to this generation request, the electronic signature of the ECU public key is generated by the signature generation device 6 and the generated electronic signature is transmitted from the signature generation device 6. The computer of the ECU manufacturing company 5 receives and acquires the electronic signature from the signature generation device 6 (at step S3).

Furthermore, at the ECU manufacturing company 5, the writing device 5a writes the ECU secret key and the ECU public key generated at step S1 in the storage section 32 of the ECU 3 (at step S4). The ECU secret key and the ECU public key to be written at this time are different for each ECU 3. The processing at step S4 may be performed before step S2 and step S3 or may be performed in parallel with the steps.

The computer of the ECU manufacturing company 5 generates a QR code 3B on the basis of information including the electronic signature acquired from the signature generation device 6 at step S3, the ECU public key and the ID of the ECU 3 in which the ECU public key is written (at step S5). Next, the printing device 5b of the ECU manufacturing company 5 prints the QR code 3B generated at step S5 at a predetermined place on the box 3A accommodating the ECU 3 (at step S6). After that, for example, the transport device of the ECU manufacturing company 5 accommodates the ECU 3, the ECU secret key and the ECU public key having been written in the storage section 32 thereof at step S4, into the box 3A on which the QR code 3B has been printed at step S6 (at step S7), whereby the manufacturing of the ECU 3 is completed. At the time when the ECU 3 is accommodated into the box 3A at step S7, the ECU 3 and the box 3A are required to be combined properly so that the public key stored in the storage section 32 of the ECU 3 coincides with the ECU public key included in the QR code 3B printed on the box 3A.

Installing ECU in Vehicle

Figure 9:
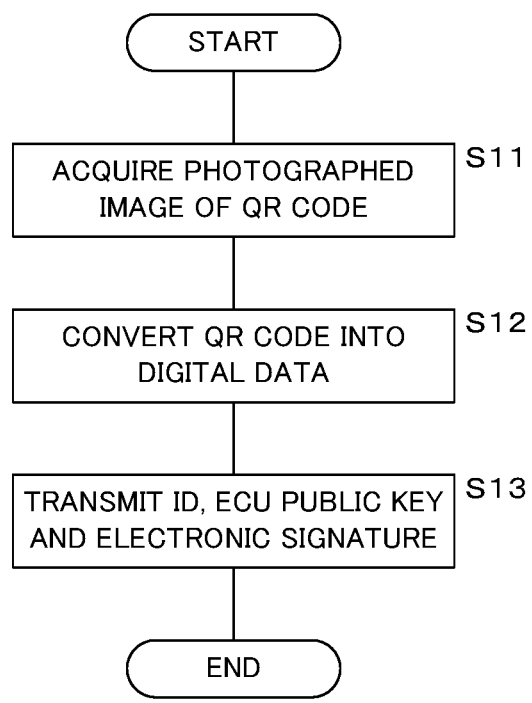
FIG. 9 is a flow chart illustrating a method for installing the ECU in a vehicle.

FIG. 9 is a flow chart illustrating a method for installing the ECU 3 in the vehicle 1. The manufactured ECU 3 is mounted on the vehicle 1 at the manufacturing company, the dealer or the maintenance shop of the vehicle 1. At this time, the worker performing the installation of the ECU 3 first requires to read the QR code 3B printed on the box 3A accommodating the ECU 3 using the image reading device 7. The image reading device 7 acquires a photographed image of the QR code 3B printed on the box 3A using the camera 73, for example, according to the photographing operation of the worker (at step S11). And then, the image reading device 7 performs processing for converting the QR code 3B taken in the photographed image acquired using the camera 73 into digital data (at step S12).

After that, the image reading device 7 transmits the information, such as the ID of the ECU 3, the ECU public key and the electronic signature, included in the digital data obtained by the conversion at step S12 to the gateway 2 connected via the communication cable 7a (at step S13), thereby ending the processing. Before step S13, the worker is required to connect the gateway 2 of the vehicle 1 to the image reading device 7 via the communication cable 7a. Moreover, before the gateway 2 and the image reading device 7 mutually connected via the communication cable 7a start the transmission and reception of the information, processing for confirming whether, for example, the image reading device 7 or the worker has authentic authority, may be performed; for example, processing for requesting the worker operating the image reading device 7 to input a password or the like may be performed.

Figure 10:
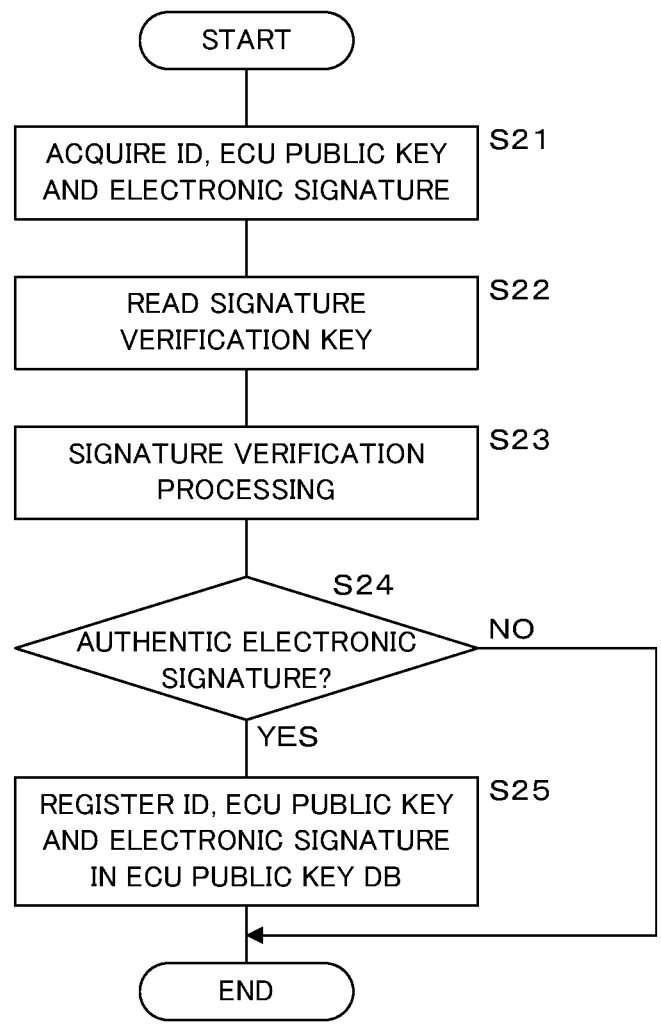
FIG. 10 is a flow chart showing the procedure for acquiring an ECU public key performed by the gateway.

FIG. 10 is a flow chart showing the procedure for acquiring the ECU public key performed by the gateway 2. The ECU public key acquisition section 21a of the processing section 21 in the gateway 2 to which the image reading device 7 is connected via the communication cable 7a acquires the information, such as the ID of the ECU 3, the ECU public key and the electronic signature, transmitted from the image reading device 7 (at step S21). Next, the signature verification section 21b of the processing section 21 reads the signature verification key 22d stored in the storage section 22 (at step S22). The signature verification section 21b performs signature verification processing using the ECU public key and the electronic signature acquired at step S21 and the signature verification key 22d read at step S22 (at step S23). The signature verification section 21b determines whether the electronic signature acquired at step S21 is an authentic electronic signature according to the result of the signature verification processing (at step S24). In the case that the electronic signature is authentic (YES at step S24), the signature verification section 21b registers the information including the ID of the ECU 3, the ECU public key and the electronic signature acquired at step S21 in the ECU public key DB 22f of the storage section 22 (at step S25), thereby ending the processing. In the case that the electronic signature is not authentic (NO at step S24), the signature verification section 21b ends the processing without registering the information, for example, the ID, the ECU public key and the electronic signature.

Figure 11:
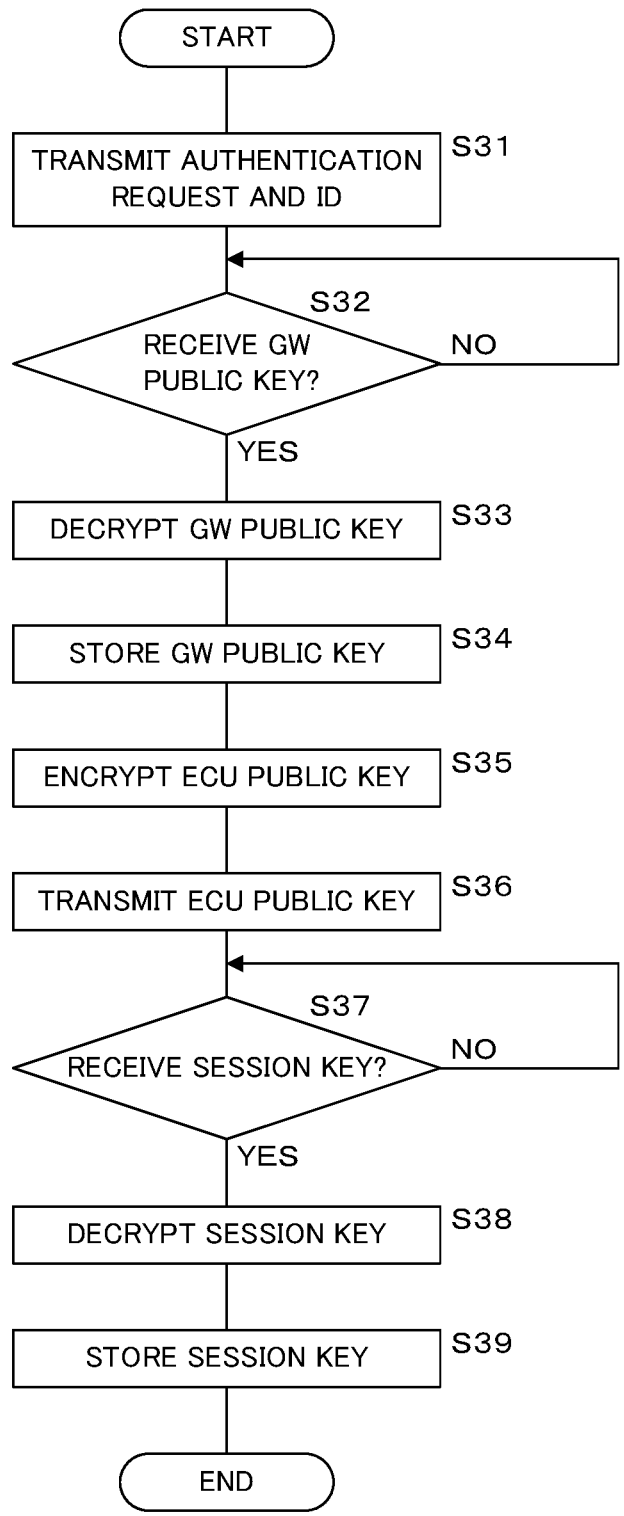
FIG. 11 is a flow chart showing the procedure for authentication processing performed by the ECU.

FIG. 11 is a flow chart showing the procedure for authentication processing performed by the ECU 3. In the case that the ECU 3 is connected to the communication line 1a inside the vehicle 1 and that, for example, a predetermined operation is performed by the worker, the identification information transmitting section 31a of the processing section 31 in the ECU 3 transmits an authentication request and the ID of the ECU 3 to the gateway 2 (at step S31). After that, the GW public key receiving section 31b of the processing section 31 determines whether the GW public key transmitted from the gateway 2 is received via the communication section 33 (at step S32). In the case that the GW public key is not received (NO at step S32), the GW public key receiving section 31b stands by until the GW public key is received.

In the case that the GW public key is received from the gateway 2 (YES at step S32), the GW public key decrypting section 31c of the processing section 31 decrypts the received GW public key using the ECU secret key 32b stored in the storage section 32 (at step S33). The GW public key decrypting section 31c stores the decrypted GW public key in the storage section 32 (at step S34). Next, the ECU public key encrypting section 31d of the processing section 31 encrypts the ECU public key 32c stored in the storage section 32 using the GW public key stored in the storage section 32 (at step S35). The ECU public key transmitting section 31e of the processing section 31 transmits the ECU public key encrypted at step S35 to the gateway 2 via the communication section 33 (at step S36).

Next, the session key receiving section 31f of the processing section 31 determines whether the session key transmitted from the gateway 2 is received via the communication section 33 (at step S37). In the case that the session key is not received (NO at step S37), the session key receiving section 31f stands by until the session key is received. In the case that the session key is received from the gateway 2 (YES at step S37), the session key decrypting section 31g of the processing section 31 decrypts the session key received at step S37 using the GW public key stored in the storage section 32 (at step S38). The session key decrypting section 31g stores the decrypted session key in the storage section 32 (at step S39), thereby ending the processing.

FIG. 12 is a flow chart showing the procedure for authentication processing performed by the gateway 2. The identification information receiving section 21c of the processing section 21 in the gateway 2 determines whether the authentication request and the ID transmitted from the ECU 3 are received (at step S51). In the case that the authentication request and the ID are not received (NO at step S51), the identification information receiving section 21c stands by until the authentication request and the ID are received. In the case that the authentication request and the ID from the ECU 3 are received (YES at step S51), the GW public key encrypting section 21d of the processing section 21 reads the ECU public key corresponding to the received ID from the ECU public key DB 22f of the storage section 22 (at step S52). The GW public key encrypting section 21d encrypts the GW public key stored in the storage section 22 using the ECU public key read at step S52 (at step S53). The GW public key transmitting section 21e of the processing section 21 transmits the ECU public key encrypted at step S53 to the ECU 3 serving as the authentication request transmission source via the communication section 23 (at step S54).

Next, the ECU public key receiving section 21f of the processing section 21 determines whether the ECU public key transmitted from the ECU 3 is received (at step S55). In the case that the ECU public key is not received (NO at step S55), the ECU public key receiving section 21f stands by until the ECU public key is received. In the case that the ECU public key is received from the ECU 3 (YES at step S55), ECU public key decrypting section 21g of the processing section 21 decrypts the ECU public key received at step S55 using the GW secret key 22b stored in the storage section 22 (at step S56). The ECU public key determination section 21h of the processing section 21 determines whether the ECU public key decrypted at step S56 coincides with the ECU public key read at step S52, thereby determining whether the ECU public key decrypted at step S56 is authentic (at step S57).

In the case that the ECU public key is authentic (YES at step S57), the session key encrypting section 21i of the processing section 21 reads the session key stored in the storage section 22 and encrypts the session key (at step S58). The session key transmitting section 21j of the processing section 21 transmits the session key encrypted at step S58 to the ECU 3 via the communication section 23 (at step S59), thereby ending the processing. In the case that the ECU public key is not authentic (NO at step S57), the processing section 21 ends the processing without performing encrypting and transmitting the session key.

Summary

In the on-vehicle authentication system according to this embodiment configured as desired above, the gateway 2 mounted on the vehicle 1 authenticates an ECU 3 newly connected to the network (the communication line 1a) inside the vehicle 1 (more specifically, determines whether the ECU 3 is an authentic device). The ECU 3 stores the ECU secret key and the ECU public key in the storage section 32. The gateway 2 stores the GW secret key, the GW public key and the signature verification key for verifying whether the electronic signature is authentic in the storage section 22. Since the ECU 3 and the gateway 2 are not required to preliminarily store common key information, such key information can be preliminarily stored, for example, in the manufacturing stage of each device, whereby the key information is not required to be written when the ECU 3 is installed in the vehicle 1.

First, the gateway 2 acquires the ECU public key of the ECU 3 newly connected to the network inside the vehicle 1. Although any methods may be used as a method for acquiring the ECU public key performed by the gateway 2, a method in which the gateway 2 acquires the ECU public key by reading the QR code 3B printed on the box 3A accommodating the ECU 3 using the image reading device 7 is adopted in this embodiment. The gateway 2 having acquired the ECU public key verifies whether the electronic signature attached to the ECU public key is authentic using the signature verification key stored in the storage section 22 and stores the authentic ECU public key in the ECU public key DB 22f of the storage section 22.

By using the ECU public key stored in the ECU public key DB 22f, the gateway 2 encrypts the GW public key stored in the storage section 22 and transmits the encrypted GW public key to the newly connected ECU 3. The GW public key transmitted at this time can be decrypted only by the ECU 3 having the ECU secret key that is paired with the ECU public key having been used for the encryption. Upon receiving the encrypted GW public key from the gateway 2, the ECU 3 decrypts the received GW public key using the ECU secret key stored in the storage section 32. The ECU 3 encrypts the ECU public key stored in the storage section 32 using the decrypted GW public key and transmits the encrypted ECU public key to the gateway 2. The ECU public key transmitted at this time can be decrypted only by the gateway 2 having the GW secret key that is paired with the GW public key having been used for the encryption.

Upon receiving the encrypted ECU public key from the ECU 3, the gateway 2 decrypts the ECU public key using the GW secret key stored in the storage section 22 and determines whether the decrypted ECU public key is authentic. At this time, in the case that, for example, the ECU public key received from the ECU 3 coincides with the ECU public key acquired from the QR code 3B, the gateway 2 determines that the ECU public key received from the ECU 3 is authentic. In the case of determining that the ECU public key is authentic, the gateway 2 determines (authenticates) that the ECU 3 serving as the transmission source of the ECU public key is an authentic device.

As described above, in the on-vehicle authentication system according to this embodiment, for the authentication of the ECU 3 newly connected to the network inside the vehicle 1, the gateway 2 or the ECU 3 is not required to communicate with a server device or the like outside the vehicle 1. Furthermore, since the ECU secret key and the GW secret key that should be prevented from leaking may merely be preliminarily written in the storage sections of the respective devices, for example, at the manufacturing stages of the respective devices, the worker who connects the ECU 3 does not require to handle the ECU secret key and the GW secret key, whereby it is possible to prevent a malicious worker from illegally acquiring the ECU secret key and the GW secret key.

Moreover, in this embodiment, the gateway 2 stores the session key to be used for the communication via the network inside the vehicle 1 and performs processing for transmitting the session key to the new ECU 3 having been determined to be authentic. The session key is a common key that is shared by all the devices connected to the network inside the vehicle 1, and the session key is used, for example, to perform processing for encrypting and decrypting information to be transmitted and received or to perform processing for generating and authenticating the message authenticator. The gateway 2 encrypts the session key using the ECU public key of the ECU 3 and transmits the encrypted session key to the ECU 3. Upon receiving the encrypted session key, the ECU 3 decrypts the session key using the ECU secret key stored in the storage section 32.

After this, the ECU 3 can communicate with the other ECUs 3 connected to the network inside the vehicle 1 using the session key.

What's more, in this embodiment, the QR code 3B, in which the ECU public key attached with the electronic signature is made visible, is generated, and the QR code 3B is printed on the box 3A accommodating the ECU 3. The QR code 3B may be printed on a place other than the box 3A; for example, the QR code 3B may be printed on the exterior part of the ECU 3 or may be printed on an accessory that is stored together with the ECU 3 in the box 3A, such as an operation manual attached to the ECU 3. When the ECU 3 is connected to the network inside the vehicle 1, the QR code 3B drawn on the main body of the ECU 3 or the accessory thereof is read using the image reading device 7. The read image is converted into information including the ECU public key attached with the electronic signature, whereby the gateway 2 can acquire the ECU public key attached with the electronic signature. The conversion from the QR code 3B to the ECU public key may be performed by the image reading device 7 or the gateway 2.

Still further, in this embodiment, the signature generation device 6 generates the electronic signature of the ECU public key of the ECU 3. The signature generation device 6 has stored the signature generation key that is paired with the signature verification key stored in the gateway 2 and generates the electronic signature of the ECU public key of the ECU 3 using the signature generation key. The signature generation device 6 generates the electronic signature, for example, before the manufacturing stage of the ECU 3, the QR code 3B is generated on the basis of the information of the ECU public key attached with the generated electronic signature, and the QR code 3B is printed in the manufacturing process of the ECU 3.

Furthermore, in this embodiment, when acquiring the ECU public key attached with the electronic signature from the ECU 3, the gateway 2 acquires the ID for identifying the ECU 3. For example, the ID of the ECU 3 is acquired by the gateway 2 via the image reading device 7 as the QR code 3B together with the ECU public key attached with the electronic signature. The gateway 2 stores the ECU public key so as to be associated with the ID of the ECU 3 in the ECU public key DB 22f of the storage section 22. When connected to the network inside the vehicle 1, the ECU 3 transmits its own ID to the gateway 2. Upon receiving this ID, the gateway 2 encrypts its own GW public key using the ECU public key associated with the received ID and transmits the encrypted GW public key to the ECU 3. Consequently, the gateway 2 can acquire the ECU public keys relating to the plurality of ECUs 3 and can authenticate the plurality of ECUs in parallel.

Although this embodiment is configured so that the gateway 2 mounted on the vehicle 1 authenticates a newly connected ECU 3, the configuration of this embodiment is not limited to this configuration. For example, this embodiment may be configured so that any one of the ECUs 3 mounted on the vehicle 1 authenticates the newly connected ECU 3 or may be configured so that an on-vehicle device other than the gateway 2 and the ECUs 3 authenticates the newly connected ECU 3.

Furthermore, although this embodiment is configured so that the gateway 2 acquires the ECU public key by reading the QR code 3B printed on the box 3A of the ECU 3 using the image reading device 7, the configuration of this embodiment is not limited to this configuration. The ECU public key may be converted into an image other than the QR code 3B and printed. Moreover, the QR code 3B may be printed on an object other than the box 3A of the ECU 3. What's more, this embodiment may be configured, for example, so that information including the ECU public key and the electronic signature is recorded on a recording medium, such as a memory card, attached to the ECU 3, and the gateway 2 acquires the ECU public key and the electronic signature from the recording medium, instead of acquiring the ECU public key by reading the image. In the case of this configuration, the gateway 2 and the recording medium may transmit and receive information through wireless communication, such as NFC (Near Field Communication). Still further, for example, information, such as the ECU public key, may be printed as a character string composed of a plurality of numerals or characters on the box 3A of the ECU 3, the operation manual of the ECU 3 or the like. In the case of this configuration, the character string may be read using the image reading device 7, or the worker may input the character string using an input device, such as a keyboard, and the gateway 2 may acquire the input character string and convert the character string into information, such as the ECU public key.

Furthermore, although this embodiment is configured so that the ECU manufacturing company 5 transmits the ECU public key to the signature generation device 6 via a network such as the Internet and the signature generation device 6 transmits the electronic signature to the ECU manufacturing company 5 via the network, the configuration of this embodiment is not limited to this configuration. For example, a method in which a recording medium with recorded information is transmitted and received by mail may be adopted for information transmission and reception between the ECU manufacturing company 5 and the signature generation device 6. Information transfer between the gateway manufacturing company 4 and the signature generation device 6 may also be performed similarly.

In this embodiment, programs, such as the authentication processing program 22a executed by the processing section 21 of the gateway 2, the authentication processing program 32a executed by the processing section 31 of the ECU 3, the signature generation program 62a executed by the processing section 61 of the signature generation device 6 and the conversion program 72a executed by the processing section 71 of the image reading device 7, can be distributed in a form recorded in a recording medium, such as an optical disc or a memory card.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:
1. An on-vehicle authentication system comprising:
   an on-vehicle authentication device,
   a plurality of electronic control units connected to the on-vehicle authentication device by a network inside a vehicle, the network being a plurality of communication lines, one of the plurality of electronic control units being a newly connected electronic control unit, the on-vehicle authentication device authenticating the newly connected electronic control unit;

the newly connected electronic control unit includes a first processor, and a first storage in which a first secret key and a first public key are stored, the on-vehicle authentication device includes a second processor, and a second storage in which a second secret key, a second public key and a signature verification key for verifying whether an electronic signature attached to the first public key is authentic are stored, wherein the second processor is configured to acquire the first public key attached with the electronic signature, verify whether the electronic signature attached to the first public key is authentic using the signature verification key stored in the second storage, encrypt the second public key stored in the second storage using the first public key attached with the electronic signature having been determined to be authentic, and transmit the encrypted second public key to the newly connected electronic control unit via the network, the first processor is configured to receive the encrypted second public key from the on-vehicle authentication device, decrypt the second public key using the first secret key stored in the first storage, encrypt the first public key stored in the first storage using the decrypted second public key, and transmit the encrypted first public key to the on-vehicle authentication device via the network, the second processor is further configured to receive the encrypted first public key from the newly connected electronic control unit, decrypt the encrypted first public key using the second secret key stored in the second storage, and determine whether the decrypted first public key is authentic, and the on-vehicle authentication device authenticates that the newly connected electronic control unit is an authentic device in the case that the decrypted first public key is authentic.

2. The on-vehicle authentication system according to claim 1, wherein the second storage of the on-vehicle authentication device stores a common key to be used for communication inside the vehicle via the network, the second processor is configured to encrypt the common key stored in the second storage using the first public key having been determined to be authentic and transmit the encrypted common key to the newly connected electronic control unit via the network, the first processor is configured to receive the encrypted common key from the on-vehicle authentication device and decrypt the common key using the first secret key stored in the first storage, and the first storage of the newly connected electronic control unit stores the decrypted common key.

3. The on-vehicle authentication system according to claim 1, wherein information in which the first public key attached with the electronic signature is made visible is drawn on the newly connected electronic control unit or an attachment of the newly connected electronic control unit, the system further comprises a visible information acquiring device for acquiring the information, and the on-vehicle authentication device acquires the first public key attached with the electronic signature on the basis of the information acquired by the visible information acquiring device.

4. The on-vehicle authentication system according to claim 1, comprising:

a signature generation device comprising a storage in which a signature generation key that is paired with the signature verification key is stored and a processor that is configured to generate an electronic signature for the input first public key using the signature generation key stored in the storage.

5. The on-vehicle authentication system according to claim 1, wherein the second processor of the on-vehicle authentication device is configured to acquire the first public key attached with the electronic signature and also acquires an identification information of the newly connected electronic control unit in which the first secret key to be paired with the first public key is stored, the second storage of the on-vehicle authentication device stores the first public key attached with the electronic signature so as to be associated with the identification information, the first processor of the newly connected electronic control unit is configured to transmit the identification information thereof to the on-vehicle authentication device at the time when connected to the network, the second processor of the on-vehicle authentication device is configured to receive the identification information from the newly connected electronic control unit, and the second processor of the on-vehicle authentication device is configured to encrypt the second public key using the first public key associated with the identification information.

6. An on-vehicle authentication device for authenticating a plurality of electronic control units connected to the on-vehicle authentication device by a network inside a vehicle, the network being a plurality of communication lines, one of the plurality of electronic control units being a newly connected electronic control unit, the on-vehicle authentication device authenticating the newly connected electronic control unit, wherein the newly connected electronic control unit includes a first processor, and a first storage in which a first secret key and a first public key are stored, the on-vehicle authentication device comprising:

a second processor, and a second storage in which a signature verification key for verifying the authenticity of an electronic signature attached to the first public key to be paired with the first secret key stored in the newly connected electronic control unit, a second secret key and a second public key are stored, wherein the second processor is configured to acquire the first public key attached with the electronic signature, perform verification using the signature verification key stored in the storage, encrypt the second public key stored in the storage using the first public key attached with the electronic signature having been determined to be authentic, transmit the second encrypted public key to the newly connected electronic control unit via the network, receive the first public key from the newly connected electronic control unit, the received first public key being encrypted by the first processor using the second public key, decrypt the encrypted first public key using the second secret key stored in the second storage, and determine whether the decrypted first public key is authentic, and authenticate that the newly connected electronic control unit is an authentic device in the case that the first public key is authentic.

7. A method for authenticating an electronic control unit, comprising:

storing a first secret key and a first public key in the first storage of the electronic control unit connected to the network inside a vehicle, storing a second secret key, a second public key and a signature verification key for verifying the authenticity of an electronic signature attached to the first public key in the second storage of an on-vehicle authentication device connected to the network, acquiring, by the on-vehicle authentication device, the first public key attached with the electronic signature; verifying the authenticity of the electronic signature attached to the acquired first public key using the signature verification key stored in the second storage; encrypting the second public key stored in the second storage using the first public key attached with the electronic signature having been determined to be authentic by the verification; and transmitting the encrypted second public key to the electronic control unit via the network, receiving, by the electronic control unit, the encrypted second public key from the on-vehicle authentication device; decrypting the received second public key using the first secret key stored in the first storage; encrypting the first public key stored in the first storage using the decrypted second public key; and transmitting the encrypted first public key to the on-vehicle authentication device via the network, and receiving, by the on-vehicle authentication device, the encrypted first public key from the electronic control unit; decrypting the received encrypted first public key using the second secret key stored in the second storage;

determining the authenticity of the decrypted first public key; and authenticating that the electronic control unit is an authentic device in the case that the first public key has been determined to be authentic.

8. A method for authenticating an electronic control unit comprising:

generating, by a signature generation device, an electronic signature of a first public key, writing, by an information writing device, the first public key and a first secret key to be paired with the first public key in a first storage of the electronic control unit connected to a network inside a vehicle, printing, by a printing device, information in which the first public key attached with the electronic signature is made visible on the electronic control unit or an attachment of the electronic control unit, writing, by an information writing device, a second secret key, a second public key and a signature verification key for verifying the authenticity of the electronic signature attached to the first public key in a second storage of an on-vehicle authentication device, acquiring, by a visible information acquiring device, the printed information, acquiring, by the on-vehicle authentication device, the first public key attached with the electronic signature on the basis of the information acquired by the visible information acquiring device; verifying the authenticity of the electronic signature attached to the acquired first public key using the signature verification key stored in the second storage; encrypting the second public key stored in the second storage using the first public key attached with the electronic signature having been determined to be authentic by the verification; and transmitting the encrypted second public key to the electronic control unit via the network, receiving, by the electronic control unit, the encrypted second public key from the on-vehicle authentication device; decrypting the received second public key using the first secret key stored in the first storage; encrypting the first public key stored in the first storage using the decrypted second public key; and transmitting the encrypted first public key to the on-vehicle authentication device via the network, and receiving, by the on-vehicle authentication device, the encrypted first public key from the electronic control unit; decrypting the received first public key using the second secret key stored in the second storage; determining the authenticity of the decrypted first public key; and authenticating that the electronic control unit is an authentic device in the case that the first public key has been determined to be authentic.

* * * * *